(12) United States Patent
Lu et al.

(10) Patent No.: US 12,096,427 B2
(45) Date of Patent: *Sep. 17, 2024

(54) METHODS, DEVICES, AND SYSTEMS FOR DEVICE TO DEVICE (D2D) DATA TRANSMISSION AND RETRANSMISSION

(71) Applicant: Huawei Technologies Co., Ltd., Shenzhen (CN)

(72) Inventors: Zhenwei Lu, Beijing (CN); Deping Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 104 days.

This patent is subject to a terminal disclaimer.

(21) Appl. No.: 17/375,052

(22) Filed: Jul. 14, 2021

(65) Prior Publication Data
US 2021/0345378 A1 Nov. 4, 2021

Related U.S. Application Data

(63) Continuation of application No. 16/537,316, filed on Aug. 9, 2019, now Pat. No. 11,096,200, which is a (Continued)

(51) Int. Cl.
H04W 72/04 (2023.01)
H04L 1/1867 (2023.01)
(Continued)

(52) U.S. Cl.
CPC ......... H04W 72/1273 (2013.01); H04L 1/189 (2013.01); H04W 72/0466 (2013.01);
(Continued)

(58) Field of Classification Search
CPC ......... H04W 72/1273; H04W 72/0466; H04W 72/1289; H04W 76/11; H04W 88/04;
(Continued)

(56) References Cited

U.S. PATENT DOCUMENTS 11,005,607 B2 * 5/2021 Basu Mallick ....... H04L 1/1887
2013/0322413 A1 * 12/2013 Pelletier ................ H04L 1/1822
                                                        370/336
(Continued)

FOREIGN PATENT DOCUMENTS

CN 103368706 A 10/2013
CN 103825687 A 5/2014
(Continued)

*Primary Examiner* — Mahbubul Bar Chowdhury
(74) *Attorney, Agent, or Firm* — Slater Matsil, LLP

(57) ABSTRACT

Embodiments of this application disclose a data transmission method, including: sending, by a base station, first scheduling information to first UE, where the first scheduling information is used to instruct the first UE to send data to second UE based on the first scheduling information; receiving, by the base station, first feedback information sent by the first UE; and sending, by the base station, second scheduling information to the first UE if the first feedback information indicates that the second UE fails to receive the data. The embodiments of this application further provide a base station, UE, and a data transmission system.

17 Claims, 13 Drawing Sheets

Related U.S. Application Data continuation of application No. PCT/CN2017/073217, filed on Feb. 10, 2017.

(51) Int. Cl.
*H04W 72/044* (2023.01)
*H04W 72/1273* (2023.01)
*H04W 76/11* (2018.01)
*H04W 88/04* (2009.01)
*H04W 88/08* (2009.01)
*H04W 92/18* (2009.01)

(52) U.S. Cl.
CPC ............ *H04W 76/11* (2018.02); *H04W 88/04* (2013.01); *H04W 88/08* (2013.01); *H04W 92/18* (2013.01)

(58) Field of Classification Search
CPC ................. H04W 88/08; H04W 92/18; H04W 28/0236; H04W 28/04; H04L 1/189; H04L 1/1887; H04L 1/1896; H04L 1/16; H04L 69/40
See application file for complete search history.

(56) References Cited

U.S. PATENT DOCUMENTS

| | | |
|---|---|---|
| 2014/0376489 A1 | 12/2014 | Lee et al. |
| 2015/0023267 A1 | 1/2015 | Lim et al. |
| 2015/0189642 A1 | 7/2015 | Yang et al. |
| 2016/0044665 A1* | 2/2016 | Novlan ............. H04W 72/0406 370/336 |
| 2017/0134935 A1 | 5/2017 | Wei |
| 2017/0347394 A1* | 11/2017 | Yasukawa ............. H04W 92/18 |
| 2018/0049143 A1* | 2/2018 | Gupta ................... H04W 16/14 |
| 2018/0077716 A1 | 3/2018 | Dai et al. |
| 2018/0213379 A1* | 7/2018 | Xiong ..................... H04W 4/70 |
| 2019/0116609 A1* | 4/2019 | Feng ................. H04W 72/1263 |
| 2019/0182827 A1* | 6/2019 | Wang ................ H04W 72/1278 |
| 2021/0028891 A1* | 1/2021 | Zhou ....................... H04W 4/40 |
| 2021/0135796 A1* | 5/2021 | Fong .................... H04W 72/23 |
| 2021/0176774 A1* | 6/2021 | Feng ................... H04W 72/042 |
| 2021/0314097 A1* | 10/2021 | Osawa .................. H04L 1/1861 |
| 2021/0352647 A1* | 11/2021 | Loehr ............... H04W 72/0446 |

FOREIGN PATENT DOCUMENTS

| | | |
|---|---|---|
| CN | 104380627 A | 2/2015 |
| CN | 104640057 A | 5/2015 |
| CN | 105338518 A | 2/2016 |
| CN | 105991247 A | 10/2016 |
| CN | 106034013 A | 10/2016 |
| JP | 2014532340 A | 12/2014 |
| WO | 2014076552 A2 | 5/2014 |
| WO | 2015142115 A1 | 9/2015 |
| WO | 2016076301 A1 | 5/2016 |
| WO | WO-2016131344 A1 * | 8/2016 ........... H04L 1/1819 |

* cited by examiner

METHODS, DEVICES, AND SYSTEMS FOR DEVICE TO DEVICE (D2D) DATA TRANSMISSION AND RETRANSMISSION

CROSS-REFERENCE TO RELATED APPLICATIONS

This application is a continuation of U.S. patent application Ser. No. 16/537,316, filed on Aug. 9, 2019, which is a continuation of International Application No. PCT/CN2017/073217, filed on Feb. 10, 2017, applications of which are hereby incorporated by reference in their entireties.

TECHNICAL FIELD

This application relates to the communications field, and in particular, to a data transmission method, a related device, and a system.

BACKGROUND

Terminal to terminal (Device to Device, D2D) is an end-to-end direct communication technology. A biggest difference from a conventional cellular communications technology is as follows: D2D communication no longer requires a base station to perform forwarding, and the base station may configure, schedule, and coordinate a resource, and the like, to assist terminals in directly communicating with each other. Similar to D2D, vehicle-to-vehicle (V2V) direct communication can also be implemented in a long term evolution-vehicle (LTE-V) solution. The terminal and a vehicle each are user equipments (UE). The base station may assign a time-frequency resource to each UE on a sidelink, or the UE may select a time-frequency resource from a resource pool by itself.

The D2D technology is used as an example. Unicast and multicast mechanisms are supported in the D2D technology. FIG. 1 is a schematic diagram of an embodiment of implementing data transmission in a D2D technology according to this application. As shown in the figure, a base station sends downlink control information (DCI) to UE 1, and the UE 1 sends data to UE 2 on a sidelink based on the DCI. The UE 1 adds an identifier of the UE 2 to the sent data, so that after receiving the data, the UE 2 can determine whether the data includes the identifier. If the data includes the identifier, it is considered that the data can be received. If the data does not include the identifier, the data is discarded.

Direct communication between the UE 1 and the UE 2 can be implemented by using a transmission manner described in FIG. 1 to transmit data. However, if a problem such as relatively poor network quality occurs, the UE 2 may fail to receive the data. However, the UE 1 cannot perceive a data receiving status of the UE 2. Therefore, the base station cannot determine whether a corresponding retransmission resource needs to be assigned, thereby reducing reliability of transmitting data between the two UEs.

SUMMARY

Embodiments of this application provide a data transmission method, a related device, and a system, so that first UE can perceive a data receiving status of second UE by receiving first feedback information, and accordingly a corresponding resource can be assigned again for data retransmission, thereby improving reliability of data transmission between the two UEs.

A first aspect of the embodiments of this application provides a data transmission method, where the method may include:

A base station first sends first scheduling information to first UE, where the first scheduling information may be specifically downlink control information. In this application, the first scheduling information is used to instruct the first UE to send data to second UE based on the first scheduling information.

Then the first UE receives the first scheduling information sent by the base station, and sends the data to the second UE based on the first scheduling information. However, the second UE is not necessarily able to accurately receive the data sent by the first UE. Therefore, after learning whether the second UE successfully receives the data, the first UE sends first feedback information to the base station.

Further, the base station receives the first feedback information sent by the first UE, where the first feedback information may indicate whether the second UE successfully receives the data. The base station sends second scheduling information to the first UE if the first feedback information indicates that the second UE fails to receive the data, where the second scheduling information is used to indicate that the first UE needs to resend the data to the second UE.

Certainly, in actual application, if the second UE fails to receive the data again, the base station may further continue to send third scheduling information to instruct the first UE to send the data to the second UE again. It may be understood that a quantity of times of retransmitting the data is usually preset, to be specific, continuing retransmission stops once the quantity of times of retransmitting the data is greater than or equal to N, where N is a positive integer.

In technical solutions of the embodiments of this application, the data transmission method is provided. First, the base station sends the first scheduling information to the first UE, where the first scheduling information is used to instruct the first UE to send the data to the second UE. Then the base station receives the first feedback information sent by the first UE, where the first feedback information is used to indicate whether the second UE successfully receives the data. The base station sends the second scheduling information to the first UE if the first feedback information indicates that the second UE fails to receive the data, where the second scheduling information is used to instruct the first UE to resend the data to the second UE. In the foregoing manner, the base station may determine a data receiving status of the second UE by receiving the first feedback information, so that the first UE requests, from the base station, a resource used for data retransmission, thereby improving reliability of data transmission between the two UEs.

In a possible design, in a first implementation of the first aspect of the embodiments of this application, that the base station receives the first feedback information sent by the first UE may include:

the base station receives the first feedback information sent by the first UE, where the first feedback information is determined by the first UE based on second feedback information, and the second feedback information is sent by the second UE to the first UE. Similar to the first feedback information, the second feedback information is also used to indicate whether the second UE successfully receives the data.

It should be noted that the first feedback information and the second feedback information may be completely consistent or may be different, but content indicated by the first feedback information and the second feedback information is consistent. To be specific, both the first feedback information and the second feedback information indicate that the second UE successfully receives the data, or indicate that the second UE fails to receive the data.

In addition, in the embodiments of this application, after attempting to receive feedback from the second UE on a sidelink, the first UE gives feedback to the base station, so that the base station can learn whether the transmission of the first UE on the sidelink succeeds. If the transmission does not succeed, the base station may assign a retransmission resource to the first UE. In the foregoing manner, the second UE first feeds back, to the first UE, whether the data is received, so that the first UE learns of a data receiving status of the second UE more quickly, and accordingly it is advantageous to choose, by using the first UE, whether to retransmit the data, thereby improving operability and practicability of the solution.

In a possible design, in a second implementation of the first aspect of the embodiments of this application, that the second scheduling information is used to instruct the first UE to resend the data to the second UE may include:

the second scheduling information is specifically used to instruct the first UE to resend the data to the second UE based on the second scheduling information. To be specific, the base station sends the second scheduling information to the first UE, and after receiving the second scheduling information, the first UE may resend the data to the second UE based on the second scheduling information.

It may be understood that, it is assumed that the first UE sends the data to the second UE based on the first scheduling information. When the second UE fails to receive the data, the second UE notifies the first UE that the current data fails to be received. Accordingly, the first UE may send the data to the second UE again based on the first scheduling information or the second scheduling information. However, if the second UE still fails to receive the data for the second time, the first UE may send the data to the second UE for the third time based on the first scheduling information, the second scheduling information, or the third scheduling information. By analogy, in a process in which the first UE repeatedly sends the data to the second UE, scheduling information that is the same as the first scheduling information used in initial transmission may be used, or other scheduling information may be used. This is not limited herein.

In addition, in the embodiments of this application, the second scheduling information may directly instruct the first UE to resend the data to the second UE, and a difference from the first scheduling information is that the second scheduling information may indicate a resource different from the first scheduling information, thereby increasing flexibility and feasibility of data transmission.

In a possible design, in a third implementation of the first aspect of the embodiments of this application, the second scheduling information includes downlink feedback information; and that the base station sends second scheduling information to the first UE may include:

the base station sends the downlink feedback information to the first UE; and accordingly the first UE receives the downlink feedback information, and then determines, based on the downlink feedback information, to resend the data to the second UE by using the first scheduling information. In other words, the downlink feedback information sent by the base station to the first UE may be used to indicate that scheduling information used for retransmitting the data is consistent with the first scheduling information.

In addition, in the embodiments of this application, when receiving the downlink feedback information sent by the base station, the first UE considers that a resource used for retransmitting the data is consistent with a resource used for initially transmitting the data, accordingly determines the first scheduling information based on the downlink feedback information, and retransmits the data to the second UE based on the first scheduling information. In the foregoing manner, if the resource used for retransmitting the data is consistent with the resource used for initially transmitting the data, the base station does not need to transmit the second scheduling information, but uses the first scheduling information corresponding to the initial transmission resource to instruct the first UE to perform retransmission on a sidelink, thereby improving flexibility and practicability of the solution. Proper solutions are provided for different scenarios to increase feasibility of the solution.

In a possible design, in a fourth implementation of the first aspect of the embodiments of this application, the base station may send the first scheduling information to the first UE in the following two manners:

In a first manner, the base station sends, to the first UE, the first scheduling information that includes indication information. The indication information usually may indicate at least one type of data, and a data type may be classified into data that can be retransmitted and non-retransmitted data. In other words, the first UE can learn, by using content indicated by the indication information in the first scheduling information, whether the sent data can be retransmitted.

In a second manner, the base station sends, to the first UE, the first scheduling information that is processed by using a scrambling identifier. The scrambling identifier usually may indicate at least one type of data, and a data type may be classified into data that can be retransmitted and non-retransmitted data. In other words, the first UE can learn, by using the scrambling identifier, whether the sent data can be retransmitted.

In addition, in the embodiments of this application, the base station sends, to the first UE, the first scheduling information that includes the indication information, or the base station sends, to the first UE, the first scheduling information that is processed by using the scrambling identifier. In the foregoing manner, the base station uses different scrambling identifiers or indication information to enable the first UE on a transmit side to learn, more clearly, that downlink control information assigned by the base station is used to transmit data of which type, to avoid inconsistency in data transmission between the first UE and the base station and further improve reliability of the solution.

In a possible design, in a fifth implementation of the first aspect of the embodiments of this application, the first UE and/or the second UE may further determine, based on the data type, whether to combine the initially transmitted data and the retransmitted data; and the following two manners may be specifically included:

In a first manner, the first UE and the second UE distinguish between data types by using different resource pools, for example, a resource pool specially used to send data of a data type is configured. The second UE receives data in the resource pool; and when correctly receiving sidelink control information but incorrectly receiving the data, may attempt to combine the initially transmitted data and the retransmitted data.

In a second manner, the first UE adds a piece of indication information to sidelink control information for distinguishing; and the second UE may distinguish between data types by using the indication information in the sidelink control information, and then attempt to combine corresponding initially transmitted data and retransmitted data. The indication information may be indicated by the base station to the first UE; or may be determined by a higher layer of the first UE, and is notified to a physical layer.

Further, in the embodiments of this application, the second UE may determine, based on the sidelink control information sent by the first UE, whether the data can be combined; and may further attempt to combine the corresponding initially transmitted data and the corresponding retransmitted data. In the foregoing manner, data receiving reliability may be further improved. In addition, the first UE may use a dedicated resource pool or add the indication information to the sidelink control information, to distinguish whether the data may be retransmitted, so that the second UE on a receive side can learn which data may be retransmitted, and then may consider performing a combination operation, thereby improving practicability of the solution.

In a possible design, in a sixth implementation of the first aspect of the embodiments of this application, that a base station sends first scheduling information to first UE may include:

the base station can indicate, to the first UE at a time, a resource used for initial transmission and a resource used for retransmission. In this way, the first UE does not need to send the first feedback information to the base station, and may resend the data to the second UE by using the first scheduling information received at a time. Certainly, a quantity of times of resending the data is not limited.

Further, in the embodiments of this application, the base station may directly indicate, to the first UE, the resource used for initial transmission and the resource used for retransmission, so that in a process in which the first UE performs transmission a plurality of times, the first UE can resend the data to the second UE without requiring the first UE to send the first feedback information to the base station. In the foregoing manner, in a case of the data retransmission, the base station may not need to deliver scheduling information to the first UE a plurality of times, but the first UE directly retransmits the data to the second UE, thereby further reducing signaling overheads and delays.

In a possible design, in a seventh implementation of the first aspect of the embodiments of this application, three resource assignment manners may be further included.

In a first resource assignment manner, when scheduling information for retransmission is the same as scheduling information for initial transmission, the base station needs to indicate only the scheduling information for the initial transmission to the first UE. The base station sends only the first scheduling information, and the first UE uses the first scheduling information again during the retransmission. In this manner, the second UE may not combine the initially transmitted data and the retransmitted data; or an identifier may be added to sidelink control information sent by the first UE, so that the second UE combines the initially transmitted data and the retransmitted data based on the identifier. In addition, the same scheduling information is always used for the initially transmitted data and the retransmitted data of the first UE, and the first UE includes the scheduling information in the sidelink control information. Therefore, the second UE may combine the corresponding initially transmitted data and the corresponding retransmitted data based on the received sidelink control information.

In a second resource assignment manner, when a frequency domain resource used for sidelink control information in a first transmission during retransmission is the same as a frequency domain resource used for sidelink control information in a first transmission during initial transmission, the base station needs to indicate scheduling information for each transmission to the first UE. In this manner, the second UE may not combine the initially transmitted data and the retransmitted data; or an identifier may be included in sidelink control information sent by the first UE, so that the second UE performs combination based on the identifier. In addition, because the resources for the sidelink control information in the first transmissions in the initially transmitted data and the retransmitted data of the first UE are the same, the second UE may combine the corresponding initially transmitted data and the corresponding retransmitted data based on the received sidelink control information.

In a third resource assignment manner, when there is no association relationship between scheduling information for retransmission and scheduling information for initial transmission, the base station needs to indicate scheduling information for each transmission to the first UE. In this manner, the second UE may not combine the initially transmitted data and the retransmitted data; or an identifier may be included in sidelink control information sent by the first UE, so that the second UE combines the initially transmitted data and the retransmitted data based on the identifier. In addition, the first UE may indicate, by using the sidelink control information, a resource location of sidelink control information in a first transmission during a next retransmission, so that the second UE can combine the initially transmitted data and the retransmitted data based on the sidelink control information.

Further, in the embodiments of this application, when indicating, to the first UE, the resource used for initial transmission and the resource used for retransmission, the base station may further consider processing manners in three common cases: the retransmission resource is completely the same as the initial transmission resource, or the frequency domain resource for the SCI in the first transmission during the retransmission is the same as the frequency domain resource for the SCI in the first transmission during the initial transmission, or there is no association relationship between the retransmission resource and the initial transmission resource, thereby implementing data feedback and retransmission on a sidelink. In addition, the base station may directly assign the initial transmission resource and the retransmission resource to the first UE, to further reduce signaling overheads and delays.

In a possible design, in an eighth implementation of the first aspect of the embodiments of this application, this application may be further applied to a semi-persistent scheduling scenario, and the first scheduling information is used to assign a semi-persistent scheduling resource and a retransmission resource.

The base station sends the first scheduling information to the first UE in a subframe A, where the first scheduling information indicates a semi-persistent scheduling resource. It is assumed that one period is x milliseconds, to be specific, a transmission time interval corresponding to two semi-persistent scheduling resource blocks is x milliseconds, where x is a positive number. To be specific, a first transmission of a first semi-persistent scheduling resource block occurs in an $(A+a)^{th}$ subframe, a first transmission of a second semi-persistent scheduling resource block occurs in an $(A+a+x)^{th}$ subframe, and a time interval between the two semi-persistent scheduling resource blocks is one period, where both A and a are positive integers.

Further, in the embodiments of this application, link data feedback and retransmission may be further extended to the SPS scenario based on scheduling by the base station, thereby enhancing practicability and flexibility of the solution. Therefore, a proper scenario may be selected based on an actual case to transmit data, to further improve properness of the solution.

In a possible design, in a ninth implementation of the first aspect of the embodiments of this application, that the base station receives the first feedback information sent by the first UE may include:

the base station directly receives the second feedback information sent by the second UE, to be specific, the base station does not need to learn of a data receiving status of the second UE by using the first UE, but the second UE directly notifies the base station of the data receiving status of the second UE.

In addition, in the embodiments of this application, the second UE may not need to first send the second feedback information to the first UE, and then the first UE sends the first feedback information to the base station. Instead, the second UE may directly send the second feedback information to the base station. Therefore, signaling overheads can be reduced, and it is advantageous to improve practicability of the solution.

A second aspect of the embodiments of this application provides a data transmission method, where the method includes:

A base station first sends first scheduling information to first UE, where the first scheduling information may be specifically downlink control information.

Then the first UE receives the first scheduling information sent by the base station, and sends data to the second UE based on the first scheduling information. However, the second UE is not necessarily able to accurately receive the data sent by the first UE. Therefore, after learning whether the second UE successfully receives the data, the first UE sends first feedback information to the base station.

The first feedback information is used to indicate whether the second UE successfully receives the data. If the first feedback information indicates that the second UE fails to receive the data, the base station sends second scheduling information to the first UE after learning of the first feedback message, so that the first UE can resend the data to the second UE based on the second scheduling information.

In technical solutions of the embodiments of this application, the data transmission method is provided. First, the base station sends the first scheduling information to the first UE, where the first scheduling information is used to instruct the first UE to send the data to the second UE. Then the base station receives the first feedback information sent by the first UE, where the first feedback information is used to indicate whether the second UE successfully receives the data. The base station sends the second scheduling information to the first UE if the first feedback information indicates that the second UE fails to receive the data, where the second scheduling information is used to instruct the first UE to resend the data to the second UE. In the foregoing manner, the base station may determine a data receiving status of the second UE by receiving the first feedback information, so that the first UE requests, from the base station, a resource used for data retransmission, thereby improving reliability of data transmission between the two UEs.

In a possible design, in a first implementation of the second aspect of the embodiments of this application, before the first UE sends the first feedback information to the base station, the method may further include:

the first UE receives second feedback information sent by the second UE, where similar to the first feedback information, the second feedback information is also used to indicate whether the second UE successfully receives the data; and the first UE further determines the first feedback information based on the second feedback information, and then sends the first feedback information to the base station.

It should be noted that the first feedback information and the second feedback information may be completely consistent or may be different, but content indicated by the first feedback information and the second feedback information is consistent. To be specific, both the first feedback information and the second feedback information indicate that the second UE successfully receives the data, or indicate that the second UE fails to receive the data.

In addition, in the embodiments of this application, after attempting to receive feedback from the second UE on a sidelink, the first UE gives feedback to the base station, so that the base station can learn whether the transmission of the first UE on the sidelink succeeds. If the transmission does not succeed, the base station may assign a retransmission resource to the first UE. In the foregoing manner, the second UE first feeds back, to the first UE, whether the data is received, so that the first UE learns of a data receiving status of the second UE more quickly, and accordingly it is advantageous to choose, by using the first UE, whether to retransmit the data, thereby improving operability and practicability of the solution.

In a possible design, in a second implementation of the second aspect of the embodiments of this application, that the second scheduling information is used to instruct the first UE to resend the data to the second UE may include:

the second scheduling information is specifically used to instruct the first UE to resend the data to the second UE based on the second scheduling information. To be specific, the base station sends the second scheduling information to the first UE, and after receiving the second scheduling information, the first UE may resend the data to the second UE based on the second scheduling information.

It may be understood that, it is assumed that the first UE sends the data to the second UE based on the first scheduling information. When the second UE fails to receive the data, the second UE notifies the first UE that the current data fails to be received. Accordingly, the first UE may send the data to the second UE again based on the first scheduling information or the second scheduling information. However, if the second UE still fails to receive the data for the second time, the first UE may send the data to the second UE for the third time based on the first scheduling information, the second scheduling information, or third scheduling information. By analogy, in a process in which the first UE repeatedly sends the data to the second UE, scheduling information that is the same as the first scheduling information used in initial transmission may be used, or other scheduling information may be used. This is not limited herein.

In addition, in the embodiments of this application, the second scheduling information may directly instruct the first UE to resend the data to the second UE, and a difference from the first scheduling information is that the second scheduling information may indicate a resource different from the first scheduling information, thereby increasing flexibility and feasibility of data transmission.

In a possible design, in a third implementation of the second aspect of the embodiments of this application, the second scheduling information includes downlink feedback information; and that the first UE receives the second scheduling information sent by the base station may include:

the base station sends the downlink feedback information to the first UE; and accordingly the first UE receives the downlink feedback information, and then determines, based on the downlink feedback information, to resend the data to the second UE by using the first scheduling information. In other words, the downlink feedback information sent by the base station to the first UE may be used to indicate that scheduling information used for retransmitting the data is consistent with the first scheduling information.

In addition, in the embodiments of this application, when receiving the downlink feedback information sent by the base station, the first UE considers that a resource used for retransmitting the data is consistent with a resource used for initially transmitting the data, accordingly determines the first scheduling information based on the downlink feedback information, and retransmits the data to the second UE based on the first scheduling information. In the foregoing manner, if the resource used for retransmitting the data is consistent with the resource used for initially transmitting the data, the base station does not need to transmit the second scheduling information, but uses the first scheduling information corresponding to the initial transmission resource to instruct the first UE to perform retransmission on a sidelink, thereby improving flexibility and practicability of the solution. Proper solutions are provided for different scenarios to increase feasibility of the solution.

In a possible design, in a fourth implementation of the second aspect of the embodiments of this application, after the first UE receives the downlink feedback information sent by the base station, the method may further include:

the first UE determines, based on the received downlink feedback information, to subsequently retransmit the data by using the first scheduling information, in other words, there is an association relationship between the downlink feedback information and the first scheduling information, where the first scheduling information is used to instruct the first UE to resend the data to the second UE.

In addition, in the embodiments of this application, after receiving the downlink feedback information, the first UE may further determine the first scheduling information based on the downlink feedback information. In the foregoing manner, if the resource used for retransmitting the data is consistent with the resource used for initially transmitting the data, the base station does not need to transmit the second scheduling information, but uses the first scheduling information corresponding to the initial transmission resource to instruct the first UE to perform retransmission on a sidelink, thereby improving flexibility and practicability of the solution. In addition, it is advantageous to improve operability of the solution.

In a possible design, in a fifth implementation of the second aspect of the embodiments of this application, the first UE may receive, in the following two manners, the first scheduling information sent by the base station:

In a first manner, the first UE receives the first scheduling information that includes indication information and that is sent by the base station. The indication information usually may indicate at least one type of data, and a data type may be classified into data that can be retransmitted and non-retransmitted data. In other words, the first UE can learn, by using content indicated by the indication information in the first scheduling information, whether the sent data can be retransmitted.

In a second manner, the first UE receives the first scheduling information that is processed by using a scrambling identifier and that is sent by the base station. The first scheduling information that is processed by using the scrambling identifier usually may indicate at least one type of data, and a data type may be classified into data that can be retransmitted and non-retransmitted data. In other words, the first UE can learn, by using the scrambling identifier, whether the data can be retransmitted.

In addition, in the embodiments of this application, the base station sends, to the first UE, the first scheduling information that includes the indication information, or the base station sends, to the first UE, the first scheduling information that is processed by using the scrambling identifier. In the foregoing manner, the base station uses different scrambling identifiers or indication information to enable the first UE on a transmit side to learn, more clearly, that downlink control information assigned by the base station is used to transmit data of which type, to avoid inconsistency in data transmission between the first UE and the base station and further improve reliability of the solution.

In a possible design, in a sixth implementation of the second aspect of the embodiments of this application, the first UE and/or the second UE may further determine, based on the data type, whether to combine the initially transmitted data and the retransmitted data; and the following two manners may be specifically included:

In a first manner, the first UE and the second UE distinguish between data types by using different resource pools, for example, a resource pool specially used to send data of a data type is configured. The second UE receives data in the resource pool; and when correctly receiving sidelink control information but incorrectly receiving the data, may attempt to combine the initially transmitted data and the retransmitted data.

In a second manner, the first UE adds a piece of indication information to sidelink control information for distinguishing; and the second UE may distinguish between data types by using the indication information in the sidelink control information, and then attempt to combine corresponding data. The indication information may be indicated by the base station to the first UE; or may be determined by a higher layer of the first UE, and is notified to a physical layer.

Further, in the embodiments of this application, the second UE may determine, based on the sidelink control information sent by the first UE, whether the data can be combined; and may further attempt to combine the corresponding initially transmitted data and the corresponding retransmitted data. In the foregoing manner, data receiving reliability may be further improved. In addition, the first UE may use a dedicated resource pool or add the indication information to the sidelink control information, to distinguish whether the data may be retransmitted, so that the second UE on a receive side can learn which data may be retransmitted, and then may consider performing a combination operation, thereby improving practicability of the solution.

In a possible design, in a seventh implementation of the second aspect of the embodiments of this application, that the first UE receives the first scheduling information sent by the base station may include:

the base station can indicate, to the first UE at a time, a resource used for initial transmission and a resource used for retransmission. In other words, the first UE receives, at a time, the resources sent by the base station for initial transmission and retransmission. In this way, the first UE does not need to send the first feedback information to the base station, and may resend the data to the second UE by using the first scheduling information received at a time. Certainly, a quantity of times of resending the data is not limited.

Further, in the embodiments of this application, the base station may directly indicate, to the first UE, the resource used for initial transmission and the resource used for retransmission, so that in a process in which the first UE performs transmission a plurality of times, the first UE can resend the data to the second UE without requiring the first UE to send the first feedback information to the base station. In the foregoing manner, in a case of the data retransmission, the base station may not need to deliver scheduling information to the first UE a plurality of times, but the first UE directly retransmits the data to the second UE, thereby further reducing signaling overheads and delays.

In a possible design, in an eighth implementation of the second aspect of the embodiments of this application, three resource assignment manners may be further included:

In a first resource assignment manner, when scheduling information for retransmission is the same as scheduling information for initial transmission, the first UE receives only the scheduling information for the initial transmission that is sent by the base station, and uses the first scheduling information again during the retransmission. In this manner, the second UE may not combine the initially transmitted data and the retransmitted data; or an identifier may be added to sidelink control information sent by the first UE, so that the second UE combines the initially transmitted data and the retransmitted data based on the identifier. In addition, the same scheduling information is always used for the initially transmitted data and the retransmitted data of the first UE, and the first UE includes the scheduling information in the sidelink control information. Therefore, the second UE may combine the corresponding initially transmitted data and the corresponding retransmitted data based on the received sidelink control information.

In a second resource assignment manner, when a resource used for sidelink control information in a first transmission during retransmission is the same as a frequency domain resource used for sidelink control information in a first transmission during initial transmission, the first UE needs to receive scheduling information for each transmission that is delivered by the base station. In this manner, the second UE may not combine the initially transmitted data and the retransmitted data; or an identifier may be included in sidelink control information sent by the first UE, so that the second UE performs combination based on the identifier. In addition, because the resources for the sidelink control information in the first transmissions in the initially transmitted data and the retransmitted data of the first UE are the same, the second UE may combine the corresponding initially transmitted data and the corresponding retransmitted data based on the received sidelink control information.

In a third resource assignment manner, when there is no association relationship between scheduling information for retransmission and scheduling information for initial transmission, the first UE needs to receive scheduling information for each transmission that is delivered by the base station. In this manner, the second UE may not combine the initially transmitted data and the retransmitted data; or an identifier may be included in sidelink control information sent by the first UE, so that the second UE combines the initially transmitted data and the retransmitted data based on the identifier. In addition, the first UE may indicate, by using the sidelink control information, a resource location of sidelink control information in a first transmission during a next retransmission, so that the second UE can combine the initially transmitted data and the retransmitted data based on the SCI.

Further, in the embodiments of this application, when indicating, to the first UE, the resource used for initial transmission and the resource used for retransmission, the base station may further consider processing manners in three common cases: the retransmission resource is completely the same as the initial transmission resource, or the frequency domain resource for the SCI in the first transmission during the retransmission is the same as the frequency domain resource for the SCI in the first transmission during the initial transmission, or there is no association relationship between the retransmission resource and the initial transmission resource, thereby implementing data feedback and retransmission on a sidelink. In addition, the base station may directly assign the initial transmission resource and the retransmission resource to the first UE, to further reduce signaling overheads and delays.

In a possible design, in a ninth implementation of the second aspect of the embodiments of this application, this application may be further applied to a semi-persistent scheduling scenario.

The base station sends the first scheduling information to the first UE in a subframe A, where the first scheduling information indicates a semi-persistent scheduling resource. It is assumed that one period is x milliseconds, to be specific, a transmission time interval corresponding to two semi-persistent scheduling resource blocks is x milliseconds, where x is a positive number. To be specific, a first transmission of a first semi-persistent scheduling resource block occurs in an $(A+a)^{th}$ subframe, a first transmission of a second semi-persistent scheduling resource block occurs in an $(A+a+x)^{th}$ subframe, and a time interval between the two semi-persistent scheduling resource blocks is one period, where both A and a are positive integers.

Further, in the embodiments of this application, link data feedback and retransmission may be further extended to the SPS scenario based on scheduling by the base station, thereby enhancing practicability and flexibility of the solution. Therefore, a proper scenario may be selected based on an actual case to transmit data, to further improve properness of the solution.

A third aspect of the embodiments of this application provides a base station, where the base station includes:
a sending unit, configured to send first scheduling information to first UE, where the first scheduling information is used to instruct the first UE to send data to second UE based on the first scheduling information sent by the sending unit; and
a receiving unit, configured to receive first feedback information sent by the first UE, where the first feedback information is used to indicate whether the second UE successfully receives the data, where
if the first feedback information received by the receiving unit indicates that the second UE fails to receive the data, the sending unit is further configured to send second scheduling information to the first UE, where the second scheduling information is used to instruct the first UE to resend the data to the second UE.

In a possible design, in a first implementation of the third aspect of the embodiments of this application, the first feedback information is determined by the first UE based on second feedback information, and the second feedback information is sent by the second UE to the first UE.

In a possible design, in a second implementation of the third aspect of the embodiments of this application, that the second scheduling information is used to instruct the first UE to resend the data to the second UE includes:

the second scheduling information is used to instruct the first UE to resend the data to the second UE based on the second scheduling information.

In a possible design, in a third implementation of the third aspect of the embodiments of this application, the second scheduling information includes downlink feedback information; and that the sending unit is further configured to send second scheduling information to the first UE includes:
the sending unit is further configured to send the downlink feedback information to the first UE, where the downlink feedback information is used to instruct the first UE to resend the data to the second UE based on the first scheduling information.

In a possible design, in a fourth implementation of the third aspect of the embodiments of this application, that a sending unit is configured to send first scheduling information to first UE includes:
the sending unit is configured to send, to the first UE, the first scheduling information that includes indication information, where the indication information is used to indicate that the data is data that can be retransmitted; or
the sending unit is configured to send, to the first UE, the first scheduling information that is processed by using a scrambling identifier, where the scrambling identifier is used to indicate that the data is data that can be retransmitted.

A fourth aspect of the embodiments of this application provides UE, where the UE includes:
a receiving unit, configured to receive first scheduling information sent by a base station, where the first scheduling information is used to instruct first UE to send data to second UE based on the first scheduling information; and
a sending unit, configured to send first feedback information to the base station, where the first feedback information is used to indicate whether the second UE successfully receives the data, where
if the first feedback information sent by the sending unit indicates that the second UE fails to receive the data, the receiving unit is further configured to receive second scheduling information sent by the base station, where the second scheduling information is used to instruct the first UE to resend the data to the second UE.

In a possible design, in a first implementation of the fourth aspect of the embodiments of this application, the UE further includes:
the receiving unit is further configured to: before the sending unit sends the first feedback information to the base station, receive second feedback information sent by the second UE, where the second feedback information is used to indicate whether the second UE successfully receives the data; and
a determining unit, configured to determine the first feedback information based on the second feedback information received by the receiving unit.

In a possible design, in a second implementation of the fourth aspect of the embodiments of this application, that the second scheduling information is used to instruct the first UE to resend the data to the second UE includes:
the second scheduling information is used to instruct the first UE to resend the data to the second UE based on the second scheduling information.

In a possible design, in a third implementation of the fourth aspect of the embodiments of this application, the second scheduling information includes downlink feedback information; and that the receiving unit is further configured to receive second scheduling information sent by the base station may include:
the receiving unit is further configured to receive the downlink feedback information sent by the base station, where the downlink feedback information is used to instruct the first UE to resend the data to the second UE based on the first scheduling information.

In a possible design, in a fourth implementation of the fourth aspect of the embodiments of this application, that the receiving unit is further configured to receive second scheduling information sent by the base station further includes:
the determining unit is further configured to determine the first scheduling information based on the downlink feedback information after the receiving unit receives the downlink feedback information sent by the base station, where the first scheduling information is used to instruct the first UE to resend the data to the second UE.

In a possible design, in a fifth implementation of the fourth aspect of the embodiments of this application, that a receiving unit is configured to receive first scheduling information sent by a base station includes:
the receiving unit is further configured to receive the first scheduling information that includes indication information and that is sent by the base station, where the indication information is used to indicate that the data is data that can be retransmitted; or
the receiving unit is further configured to receive the first scheduling information that is processed by using a scrambling identifier and that is sent by the base station, where the scrambling identifier is used to indicate that the data is data that can be retransmitted.

A fifth aspect of the embodiments of this application provides a base station, including a memory, a transceiver, a processor, and a bus system, where
the memory is configured to store a program and an instruction;
the transceiver is configured to receive or send information under control of the processor;
the processor is configured to execute the program in the memory;
the bus system is configured to connect the memory, the transceiver, and the processor, so that the memory, the transceiver, and the processor communicate; and
the processor is configured to invoke the program and the instruction in the memory to perform the following steps:
sending first scheduling information to first UE, where the first scheduling information is used to instruct the first UE to send data to second UE based on the first scheduling information;
receiving first feedback information sent by the first UE, where the first feedback information is used to indicate whether the second UE successfully receives the data; and
sending, by the base station, second scheduling information to the first UE if the first feedback information indicates that the second UE fails to receive the data, where the second scheduling information is used to instruct the first UE to resend the data to the second UE.

In a possible design, in a first implementation of the fifth aspect of the embodiments of this application, the processor is specifically configured to perform the following step:

receiving the first feedback information sent by the first UE, where the first feedback information is determined by the first UE based on second feedback information, and the second feedback information is sent by the second UE to the first UE.

In a possible design, in a second implementation of the fifth aspect of the embodiments of this application, the second scheduling information is used to instruct the first UE to resend the data to the second UE based on the second scheduling information.

In a possible design, in a third implementation of the fifth aspect of the embodiments of this application, the second scheduling information includes downlink feedback information; and the processor is specifically configured to perform the following step:

sending the downlink feedback information to the first UE, where the downlink feedback information is used to instruct the first UE to resend the data to the second UE based on the first scheduling information.

In a possible design, in a fourth implementation of the fifth aspect of the embodiments of this application, the processor is specifically configured to perform the following step:

sending, to the first UE, the first scheduling information that includes indication information, where the indication information is used to indicate that the data is data that can be retransmitted; or sending, to the first UE, the first scheduling information that is processed by using a scrambling identifier, where the scrambling identifier is used to indicate that the data is data that can be retransmitted.

A sixth aspect of the embodiments of this application provides UE, including a memory, a transceiver, a processor, and a bus system, where the memory is configured to store a program and an instruction;

the transceiver is configured to receive or send information under control of the processor;

the processor is configured to execute the program in the memory;

the bus system is configured to connect the memory, the transceiver, and the processor, so that the memory, the transceiver, and the processor communicate; and the processor is configured to invoke the program and the instruction in the memory to perform the following steps:

receiving first scheduling information sent by a base station, where the first scheduling information is used to instruct first UE to send data to second UE based on the first scheduling information;

sending, by the first UE, first feedback information to the base station, where the first feedback information is used to indicate whether the second UE successfully receives the data; and if the first feedback information indicates that the second UE fails to receive the data, receiving, by the first UE, second scheduling information sent by the base station, where the second scheduling information is used to instruct the first UE to resend the data to the second UE.

In a possible design, in a first implementation of the sixth aspect of the embodiments of this application, the processor is further configured to perform the following steps:

receiving second feedback information sent by the second UE, where the second feedback information is used to indicate whether the second UE successfully receives the data; and determining the first feedback information based on the second feedback information.

In a possible design, in a second implementation of the sixth aspect of the embodiments of this application, the second scheduling information is used to instruct the first UE to resend the data to the second UE based on the second scheduling information.

In a possible design, in a third implementation of the sixth aspect of the embodiments of this application, the second scheduling information may include downlink feedback information; and the processor is specifically configured to perform the following step:

receiving the downlink feedback information sent by the base station, where the downlink feedback information is used to instruct the first UE to resend the data to the second UE based on the first scheduling information.

In a possible design, in a fourth implementation of the sixth aspect of the embodiments of this application, the processor is further configured to perform the following step:

determining the first scheduling information based on the downlink feedback information, where the first scheduling information is used to instruct the first UE to resend the data to the second UE.

In a possible design, in a fifth implementation of the sixth aspect of the embodiments of this application, the processor is specifically configured to perform the following step:

receiving the first scheduling information that includes indication information and that is sent by the base station, where the indication information is used to indicate that the data is data that can be retransmitted; or receiving the first scheduling information that is processed by using a scrambling identifier and that is sent by the base station, where the scrambling identifier is used to indicate that the data is data that can be retransmitted.

A seventh aspect of the embodiments of this application provides a data transmission system, where the system may include a base station and UE.

The base station is the base station according to any one of the third aspect and the first to the fourth possible implementations of the third aspect.

The user equipment is the user equipment according to any one of the fourth aspect and the first to the fifth possible implementations of the fourth aspect.

Another aspect of this application provides a computer-readable storage medium. The computer-readable storage medium stores an instruction. When the instruction runs on a computer, the computer performs the methods in the foregoing aspects.

In the technical solutions of the embodiments of this application, the data transmission method is provided. First, the base station sends the first scheduling information to the first UE, where the first scheduling information is used to instruct the first UE to send the data to the second UE. Then the base station receives the first feedback information sent by the first UE, where the first feedback information is used to indicate whether the second UE successfully receives the data. The base station sends the second scheduling information to the first UE if the first feedback information indicates that the second UE fails to receive the data, where the second scheduling information is used to instruct the first UE to resend the data to the second UE. In the foregoing manner, the first UE may perceive the data receiving status of the second UE by receiving the first feedback information, so that a corresponding resource can be assigned again for data retransmission, thereby improving reliability of data transmission between the two UEs.

DETAILED DESCRIPTION OF ILLUSTRATIVE EMBODIMENTS

In the specification, claims, and accompanying drawings of this application, the terms "first", "second", "third", "fourth", and so on (if existent) are intended to distinguish between similar objects but do not necessarily indicate a specific order or sequence. It should be understood that the terms used in such a way is interchangeable in proper circumstances, so that the embodiments described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It should be understood that technical solutions of the embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, or the 5th generation mobile communications technology (5G). It should be noted that a specific communications system is not limited in the embodiments of this application.

Figure 1:
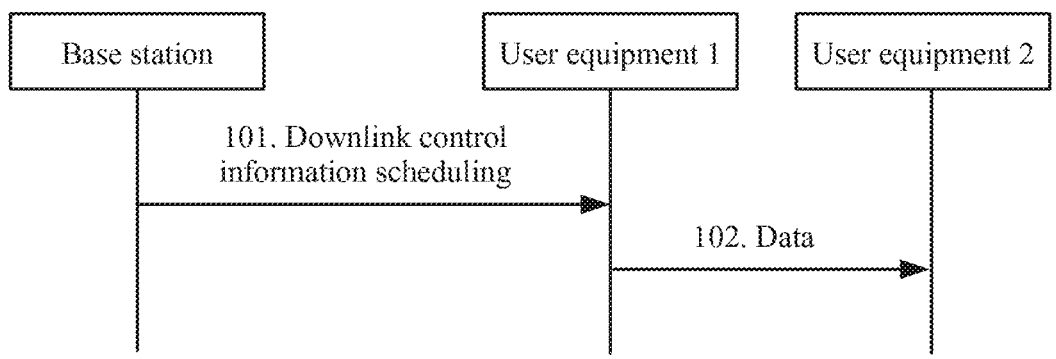
FIG. 1 is a schematic diagram of an embodiment of implementing data transmission in a D2D technology according to this application.
Figure 2:
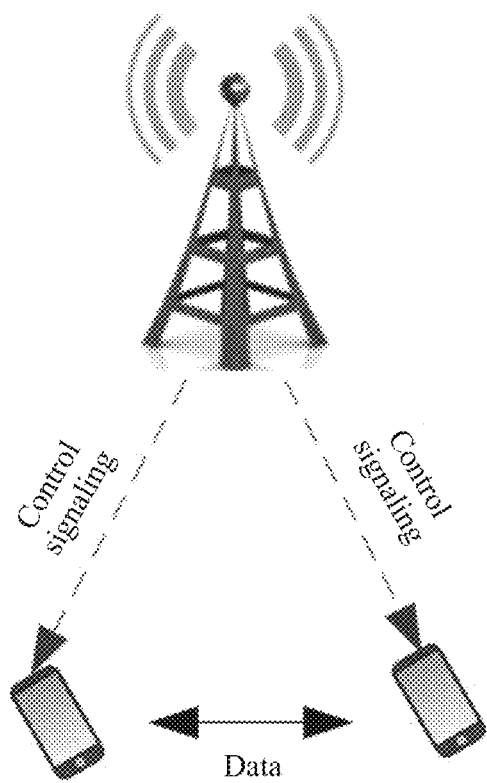
FIG. 2 is a schematic diagram of D2D communication according to an embodiment of this application.

FIG. 2 is a schematic diagram of D2D communication according to an embodiment of this application. As shown in the figure, D2D is a UE-to-UE direct communication technology. A biggest difference from a conventional cellular communications technology is as follows: UEs may directly communicate with each other without requiring a base station to perform forwarding anymore. The base station can transmit a control instruction to the UE to configure, schedule, and coordinate a resource, and the like, to assist the UEs in directly communicating with each other. In a D2D system, data transmission on a sidelink is implemented by using an uplink resource of an existing UE-to-UE (Uu) interface.

Figure 3:
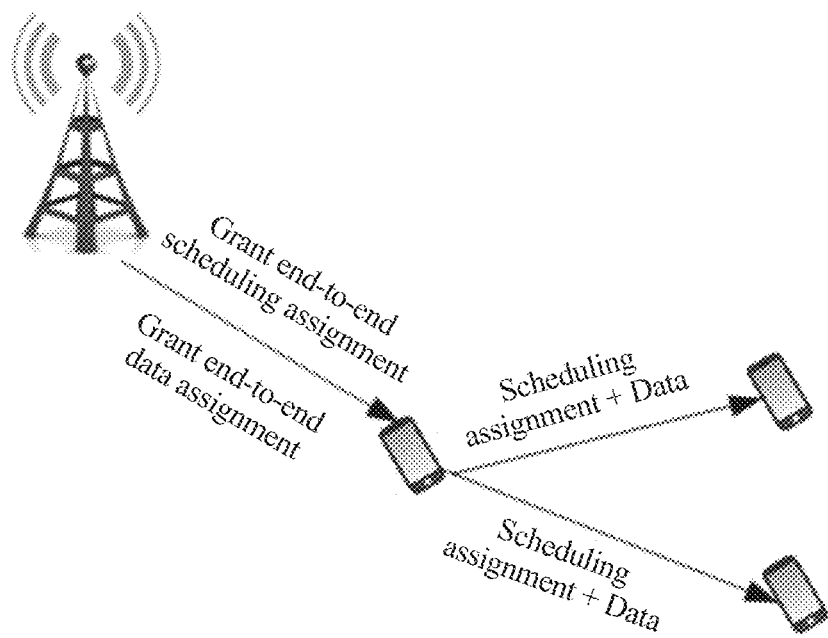
FIG. 3 is a schematic diagram of a D2D communication transmission mechanism according to an embodiment of this application.

The D2D technology is discussed in the 3rd generation partnership project (3GPP). Data is transmitted in a broadcast manner in a D2D technology in the LTE Release (Rel) 12. FIG. 3 is a schematic diagram of a D2D communication transmission mechanism according to an embodiment of this application. The D2D technology includes two characteristics: discovery and communication. The discovery means that UE periodically broadcast information, so that a user around the UE can detect the broadcast information and discover the UE. The communication is direct data transmission between UEs, to be specific, a mechanism for transmitting sidelink control information (SCI) and data together is used. The SCI is also used as resource scheduling assignment (SA).

The SCI is used to indicate status information of sending data from a transmit end, and includes time-frequency resource information, modulation and coding format (MCS) information, and the like of the data. A receive end can receive the data according to an indication of the SCI. The transmit end sends, by using a format indicated by the SCI, the data on a time-frequency resource indicated by the SCI.

Figure 4:
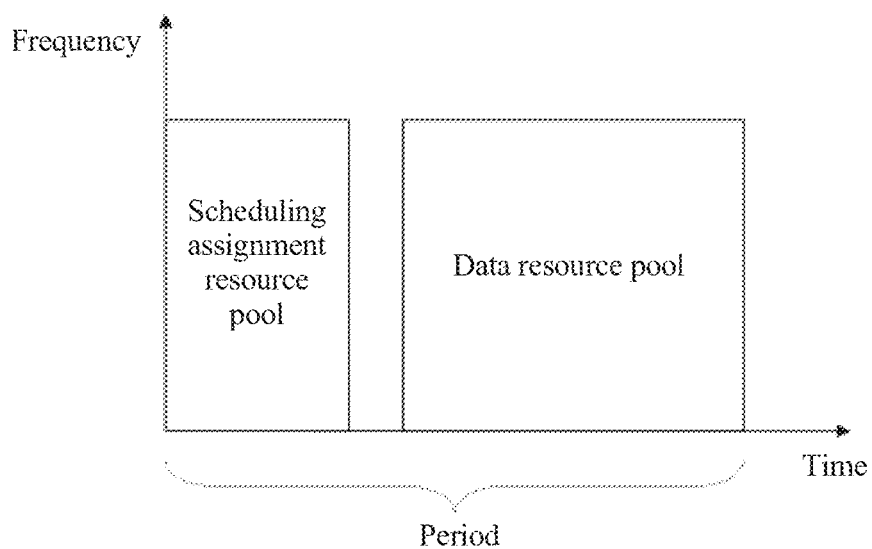
FIG. 4 is a schematic diagram of a D2D resource pool according to an embodiment of this application.

For ease of understanding, when this application is applied to the D2D field, refer to FIG. 4. FIG. 4 is a schematic diagram of a D2D resource pool according to an embodiment of this application. As shown in the figure, if UE is within a coverage area of a cell, a base station assigns a transmission resource pool to the D2D UE, where the transmission resource pool is used by the D2D UE to transmit data. The resource pool is a set of time-frequency resources, and is classified into a resource pool used for transmission and a resource pool used for receiving. The base station configures different transmission resource pools, such as an SCI transmission resource pool and a data transmission resource pool, by using system broadcast or dedicated signaling. The SCI transmission resource pool is mainly used to send SCI, and the data transmission resource pool is mainly used to send data.

Usually, there are two modes of using a resource in a resource pool. In a first mode, the base station assigns a determined time-frequency resource to each D2D UE in a resource pool, where the time-frequency resource is used by the UE to perform D2D transmission. In a second mode, the UE independently and randomly selects a resource from a resource pool to perform D2D transmission, for example, always transmit SCI twice in an SCI resource pool, and always transmit data four times in a data resource pool. In the Rel. 13, D2D may further support unicast communication between UEs, but none of broadcast communication, multicast communication, and unicast communication supports layer-1 or layer-2 feedback.

In addition, if this application is applied to an LTE-V system, relative locations of SCI and data are different from those in D2D. The SCI and the corresponding data are transmitted in a same subframe. There may be specifically two manners. In one manner, the SCI and the corresponding data always occupy adjacent resources in frequency domain. In the other manner, the SCI and the corresponding data are sent on an SCI resource pool and a data resource pool in frequency domain, respectively. In other words, the SCI and the data may be separate in frequency domain. Similar to D2D, in the LTE-V, there are also two modes of using a resource. In a first mode, a base station assigns a time-frequency resource to each UE on a sidelink, where the time-frequency resource is used by the UE to transmit data. In a second mode, UE independently selects a resource from a resource pool, and the UE selects, based on resource information previously listened and obtained by the UE, some relatively idle resources to transmit data. The SCI and the corresponding data are always sent in the same subframe. Therefore, quantities of sending times of the SCI and the data are always equal, and the SCI and the data may be sent once or twice. This is not limited herein.

It should be noted that in addition to the D2D field or the LTE-V field, this application may be applied to other types of communications fields in actual application. This is not limited herein.

Figure 5:
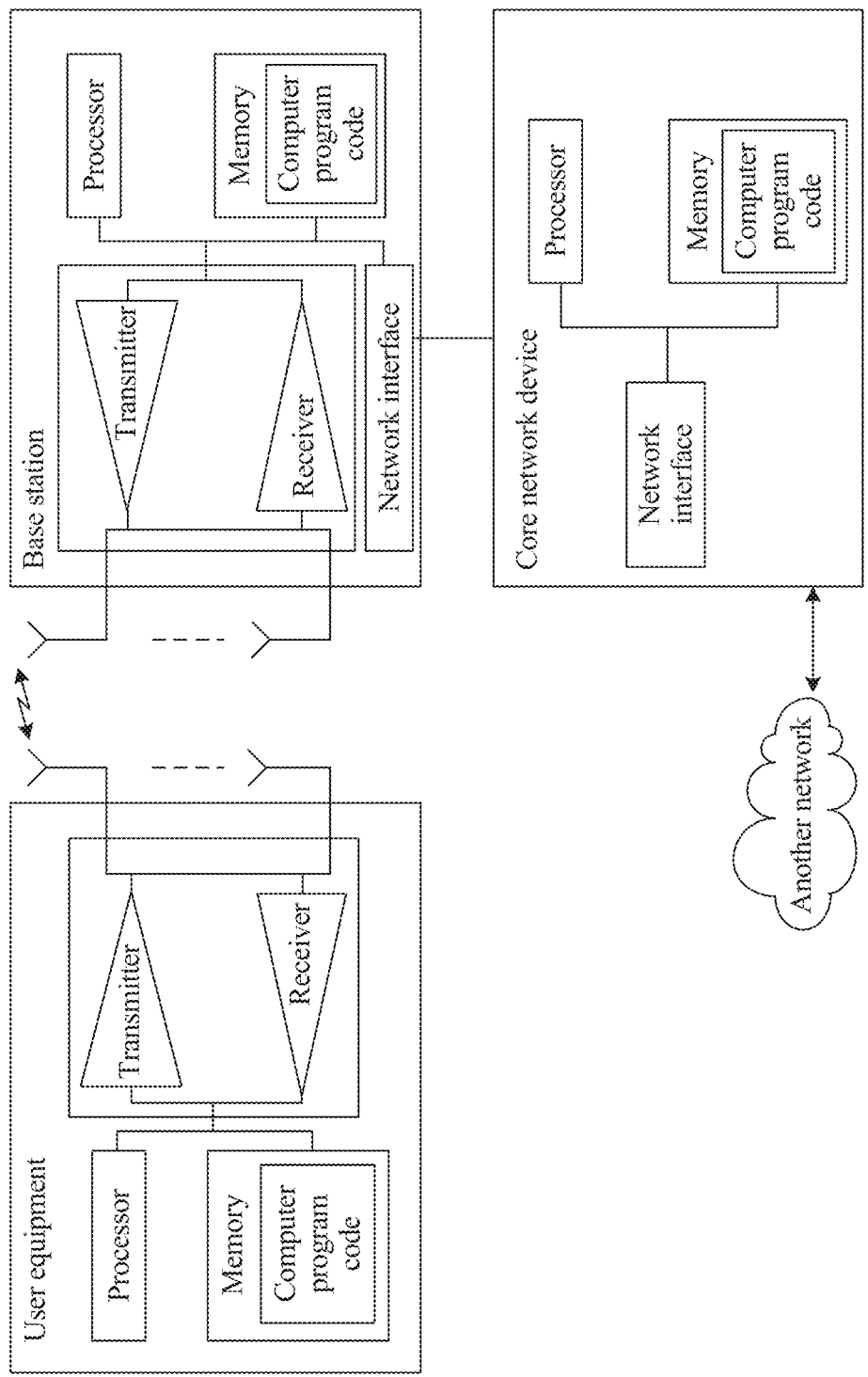
FIG. 5 is a schematic architectural diagram of a data transmission system according to an embodiment of this application.

It should be understood that this application may be specifically applied to a data transmission system shown in FIG. 5. All network elements included in the system embody specific internal structures. It should be noted that an internal structure of each network element in this embodiment is merely an example, and should not be construed as a limitation on the transmission system.

UE communicates with a base station through a wireless link. The UE includes one or more processors, one or more memories, and one or more transceivers (each transceiver includes a transmitter and a receiver) that are connected through a bus. The one or more transceivers are connected to one or more antennas. The one or more memories include computer program code.

The base station provides wireless access from the UE to a network, and includes one or more processors, one or more memories, one or more network interfaces, and one or more transceivers (each transceiver includes a receiver and a transmitter) that are connected through a bus. The one or more transceivers are connected to an antenna or an antenna array. The one or more processors include computer program code. The network interface is connected to a core network through a link (for example, a link between the network interface and the core network), or is connected to another base station through a wired or wireless link.

The network may further include a core network device, such as a network control unit, a mobility management entity (MME), or a serving gateway (S-GW), which may provide a further network connection, for example, a telephone network and/or a data communications network (such as the Internet). The base station may be connected to the core network device through a link (for example, an S1 interface). The core network device includes one or more processors, one or more memories, and one or more network interfaces that are connected through a bus. The one or more memories include computer program code.

The memories included in the UE, the base station, and the core network device may be of a type suitable for any local technology environment, and may be implemented by using any suitable data storage technology.

Various radio frequency devices in the UE, the base station, and the core network device cause a random change in a phase of an output signal under the action of noise. This makes signal demodulation difficult. In a communications system, to improve wireless system utilization and resist fading of a wireless channel, a plurality of MCSs are set, and can adapt to different signal to interference plus noise ratios (SINR). However, the base station further needs to schedule a resource for transmit-end UE a plurality of times, so that the transmit-end UE can retransmit data to receive-end UE. For unicast and multicast, a feedback and retransmission mechanism needs to be supported, to further ensure transmission reliability and meet an application-layer requirement. The solutions of this application are described below to specifically describe how to add a feedback and retransmission mechanism.

Figure 6:
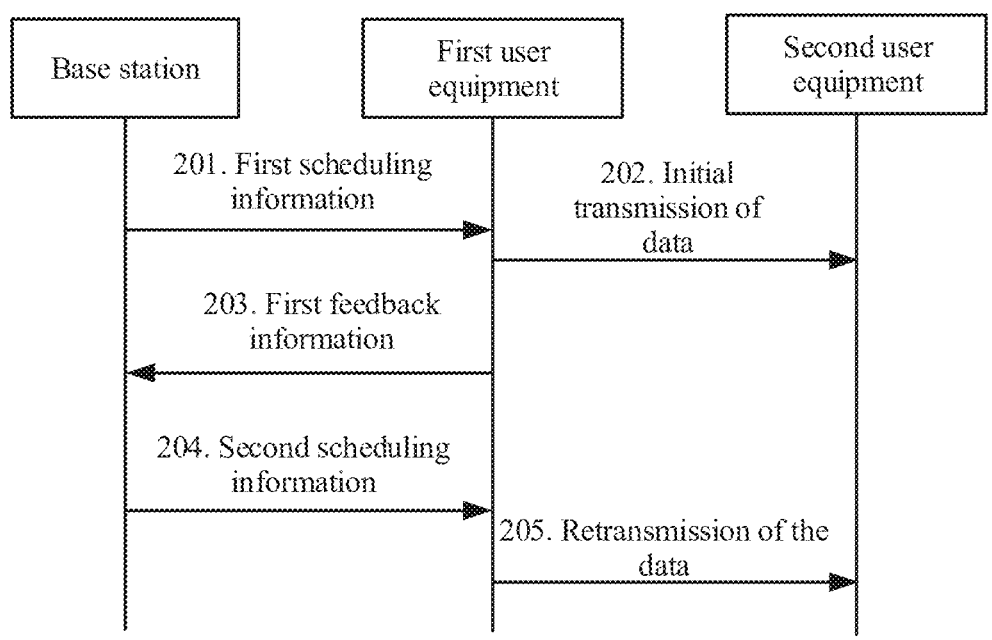
FIG. 6 is a schematic diagram of an embodiment of a data transmission method according to an embodiment of this application.

Referring to FIG. 6, an embodiment of a data transmission method in an embodiment of this application includes the following steps.

201. A base station sends first scheduling information to first UE, and the first UE receives the first scheduling information from the base station.

In this embodiment, first, the base station sends the first scheduling information to the first UE. The first scheduling information may be downlink control information (DCI), and may be specifically in a DCI format 5A. It should be noted that the DCI may be in another format. This is not limited herein. The DCI is carried in a physical downlink control channel (PDCCH).

202. The first UE receives the first scheduling information sent by the base station, and sends data to second UE based on the first scheduling information.

In this embodiment, after receiving the first scheduling information sent by the base station, the first UE can send SCI and the data on corresponding resources on a sidelink based on the first scheduling information.

203. The first UE sends first feedback information to the base station, and the base station receives the first feedback information sent by the first UE, where the first feedback information is used to indicate whether the second UE successfully receives the data.

In this embodiment, the first UE serves as a transmit end, and the second UE serves as a receive end. After the first UE sends the SCI and the data to the second UE, the second UE sends the first feedback information to the first UE, and the first UE forwards the first feedback information to the base station; or the second UE directly sends the first feedback information to the base station. The first feedback information is mainly used to notify the base station whether current data transmission succeeds, to be specific, to indicate whether the second UE receives the data sent by the first UE.

It should be noted that the first feedback information may be specifically acknowledgement (ACK) information or negative acknowledgement (NACK) information. If the first feedback information is an ACK, it indicates that the data transmission on the sidelink succeeds, and therefore the data does not need to be retransmitted. On the contrary, if the first feedback information is a NACK, it indicates that the data transmission on the sidelink fails, and accordingly content of step 204 needs to be performed.

However, in actual application, the base station determines, in a plurality of manners, that the second UE fails to receive the data. The manners are specifically as follows:

In a first manner, the first UE receives no feedback from the second UE on a corresponding feedback resource, and the first UE also gives no feedback to the base station. In this case, if the base station receives no feedback on a corresponding feedback resource, the base station considers that the second UE fails to receive the data.

In a second manner, the first UE receives no feedback from the second UE on a corresponding feedback resource, but the first UE feeds back a NACK to the base station. In this case, if the base station receives the NACK sent by the first UE, the base station considers that the second UE fails to receive the data.

In a third manner, the first UE receives a NACK fed back by the second UE, but the first UE gives no feedback to the base station. In this case, if the base station receives no feedback on a corresponding feedback resource, the base station considers that the second UE fails to receive the data.

In a fourth manner, the first UE receives a NACK fed back by the second UE, and the first UE also feeds back a NACK to the base station. In this case, if the base station receives the NACK sent by the first UE, the base station considers that the second UE fails to receive the data.

The foregoing four manners are merely examples in which the base station determines that the second UE fails to receive the data, and should not be construed as a limitation on this application.

In actual application, the base station determines, in a plurality of manners, that the second UE successfully receives the data. The manners are specifically as follows:

In a first manner, the first UE receives an ACK fed back by the second UE, and the first UE also feeds back an ACK to the base station. In this case, if the base station receives the ACK sent by the first UE, the base station considers that the second UE successfully receives the data.

In a second manner, the first UE receives an ACK fed back by the second UE, but the first UE gives no feedback to the base station on a corresponding feedback resource. In this case, if the base station receives no feedback on a corresponding feedback resource, the base station considers that the second UE successfully receives the data.

The foregoing two manners are merely examples in which the base station determines that the second UE successfully receives the data, and should not be construed as a limitation on this application.

204. If the first feedback information indicates that the second UE fails to receive the data, the base station sends second scheduling information to the first UE, and the first UE receives the second scheduling information.

In this embodiment, if the first feedback information indicates that the second UE fails to receive the data sent by the first UE, the base station sends the second scheduling information to the first UE after receiving the first feedback message. A resource indicated by the second scheduling information may be consistent with a resource indicated by the first scheduling information, or may be inconsistent with the resource indicated by the first scheduling information. The second scheduling information may be specifically DCI. The DCI includes but is not limited to resource assignment information.

205. The first UE resends the data to the second UE based on the second scheduling information, and the second UE receives the data resent by the first UE.

In this embodiment, the base station sends the second scheduling information to the first UE, so that the first UE determines, based on the second scheduling information, a resource assigned by the base station to the first UE on the sidelink. The resource is used to retransmit the data. Accordingly, the first UE retransmits the SCI and the data on corresponding resources on the sidelink.

Figure 7:
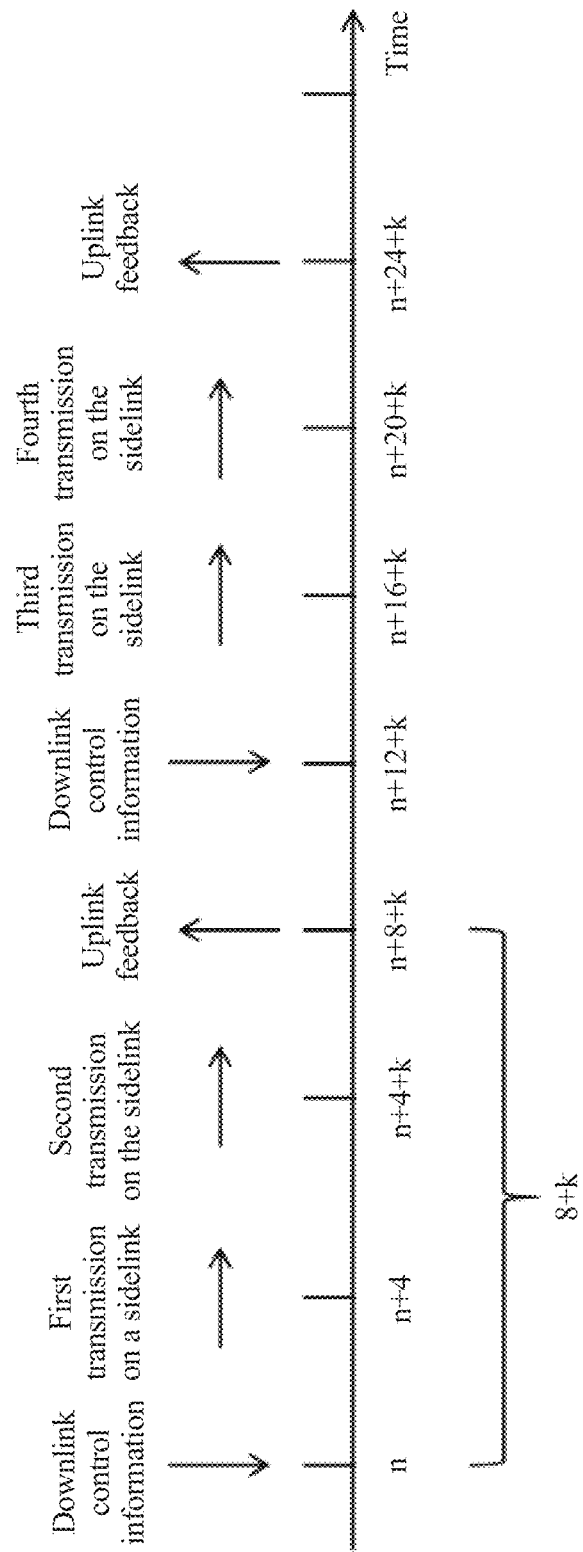
FIG. 7 is a schematic diagram of a time sequence relationship between data feedback and retransmission in an application scenario in this application.

For ease of understanding, a data transmission method in an embodiment of this application is described below in detail by using a specific application scenario as an example. FIG. 7 is a schematic diagram of a time sequence relationship between data feedback and retransmission in an application scenario in this application. Details are as follows:

A base station sends scheduling information A to first UE in an $n^{th}$ subframe, where the scheduling information A may be specifically DCI; and assigns resources for two transmissions on a sidelink to the first UE based on content indicated by the DCI. To be specific, the two transmissions correspond to a first transmission on the sidelink and a second transmission on the sidelink in the figure. The first transmission is performed in an $(n+4)^{th}$ subframe, and there is an interval of k subframes between the two transmissions. In this case, the second transmission is performed in an $(n+4+k)^{th}$ subframe. In an $(n+8+k)^{th}$ subframe, the base station attempts to receive feedback information sent by second UE. The feedback information may be specifically uplink (UL) feedback information. If the UL feedback information indicates that retransmission needs to be performed currently, the base station sends scheduling information B to the first UE in an $(n+12+k)^{th}$ subframe. The scheduling information B may also be specifically DCI, and the scheduling information B is used to assign a retransmission resource to the first UE. In an $(n+16+k)^{th}$ subframe, the first UE performs a first transmission (corresponding to a third transmission on the sidelink in the figure) during the retransmission on the sidelink.

It should be noted that a time interval between a time at which the first UE receives the scheduling information A and a time for the first data transmission during initial transmission is not limited to four subframes, and a time interval between a time at which the first UE receives the scheduling information B and a time for the first data transmission during the retransmission is also not limited to four subframes. Alternatively, there may be other time units than the subframe, for example, a slot, a symbol, or another time unit including several symbols. This is not limited herein. It may be understood that the k subframes between the two transmissions may be set based on an actual case, where k is a positive integer. In addition, an interval between the UL feedback information and the DCI is not limited to four subframes, and may be another quantity of subframes. This is not limited herein.

The base station configures a corresponding feedback resource for the second UE. The feedback resource may be at least one of a time domain resource, a frequency domain resource, and a code domain resource, and the resource is used by the second UE to send the UL feedback information. It should be noted that the base station may configure the feedback resource by using at least one of a system broadcast message, radio resource control (RRC) dedicated signaling, media access control (MAC) layer signaling, physical layer signaling, and the like. Alternatively, the second UE may determine the feedback resource by using sequence numbers of resources occupied by received SCI of the first UE. For example, the second UE selects, to send the UL feedback information, a PRB with a smallest or largest sequence number from several physical resource blocks (PRB) occupied by the SCI. In addition, a combination of the two manners may be used. This is not limited herein.

More specifically, the second UE may send the UL feedback information to the base station in a $t_1^{th}$ subframe that is after a last transmission of the first UE, where $t_1$ is a positive integer. When delivering the scheduling information A in the subframe n, the base station already knows that a subframe used by the second UE to send the UL feedback information is an $(n+t_1+t_2)^{th}$ subframe, where $t_2$ indicates that the last transmission of the first UE occurs in a $t_2^{th}$ subframe that is after the subframe n. The base station receives, in the $(n+t_1+t_2)^{th}$ subframe, the UL feedback information sent by the second UE. The UL feedback information indicates whether the transmission on the sidelink succeeds. The second UE receives the SCI from the first UE. By using the SCI, the second UE may determine a subframe for giving uplink feedback, and gives corresponding feedback. The second UE directly sends the UL feedback information to the base station without using the first UE, so that signaling overheads and delays can be effectively reduced.

After learning that the second UE correctly receives data, the base station may further notify the first UE that the data on the sidelink is correctly received; to be specific, the base station sends downlink (DL) feedback information to the first UE, for example, sends an ACK.

In a technical solution of this embodiment of this application, the data transmission method is provided. First, the base station sends the first scheduling information to the first UE, where the first scheduling information is used to instruct the first UE to send the data to the second UE. Then the base station receives the first feedback information sent by the first UE, where the first feedback information is used to indicate whether the second UE successfully receives the data. The base station sends the second scheduling information to the first UE if the first feedback information indicates that the second UE fails to receive the data, where the second scheduling information is used to instruct the first UE to resend the data to the second UE. In the foregoing manner, the base station may determine a data receiving status of the second UE by receiving the first feedback information, so that the first UE requests, from the base station, a resource used for data retransmission, thereby improving reliability of data transmission between the two UEs.

Optionally, based on the foregoing embodiment corresponding to FIG. 6, in a first optional embodiment of the data transmission method provided in this embodiment of this application, before the first UE sends the first feedback information to the base station, the method may further include:

the first UE receives second feedback information sent by the second UE, where the second feedback information is used to indicate whether the second UE successfully receives the data;

the first UE determines the first feedback information based on the second feedback information; and the first UE sends the first feedback information to the base station, and the base station receives the first feedback information sent by the first UE, where the first feedback information is determined by the first UE based on the second feedback information, and the second feedback information is sent by the second UE to the first UE.

In this embodiment, before sending the first feedback information to the base station, the first UE may receive in advance the second feedback information sent by the second UE. Similar to the first feedback information, the second feedback information is also used to indicate whether the second UE successfully receives the data. After receiving the second feedback information, the first UE may determine content of the first feedback information based on the second feedback information. For example, if the second feedback information is an ACK, the first feedback information may also be an ACK; or if the second feedback information is a NACK, the first feedback information may also be a NACK.

Figure 8:
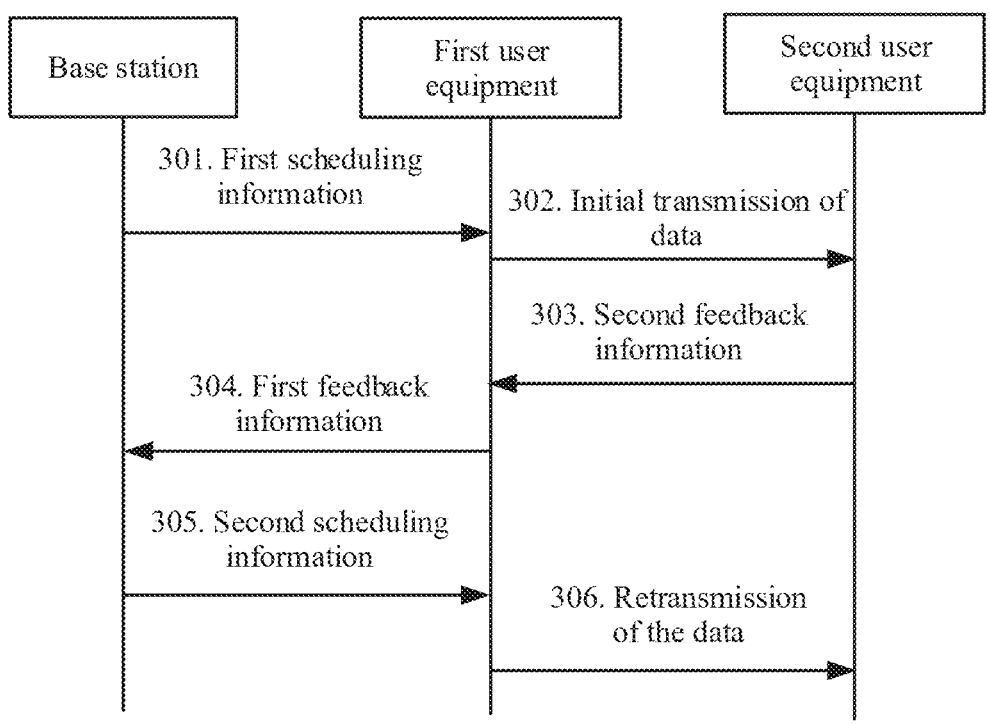
FIG. 8 is a schematic diagram of another embodiment of a data transmission method according to an embodiment of this application.

Specifically, FIG. 8 is a schematic diagram of another embodiment of a data transmission method according to an embodiment of this application. As shown in the figure, step 301 is similar to step 201, and step 302 is similar to step 202. Therefore, details are not described herein.

In step 303, the second UE gives feedback based on whether the data sent by the first UE is received, to be specific, sends second feedback information to the first UE. The second feedback information may be specifically an ACK or a NACK, the ACK indicates that the second UE successfully receives the data and SCI, and the NACK indicates that the second UE fails to receive the data and/or SCI. In addition, if the base station receives no feedback on a corresponding feedback resource, the base station may consider that the second UE fails to receive the data.

Step 304 to step 306 are similar to step 203 to step 205 in the foregoing embodiment corresponding to FIG. 6. Therefore, details are not described herein.

Figure 9:
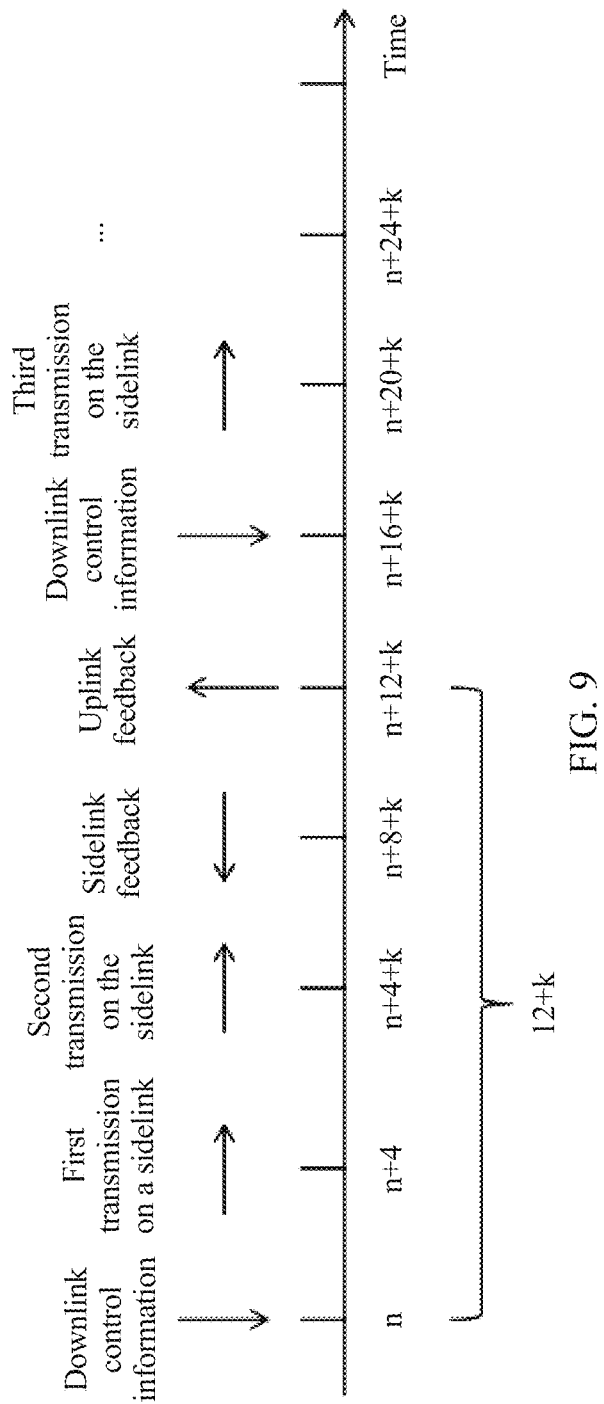
FIG. 9 is a schematic diagram of another time sequence relationship between data feedback and retransmission in an application scenario in this application.

For ease of understanding, a data transmission method in an embodiment of this application is described below in detail by using a specific application scenario as an example. FIG. 9 is a schematic diagram of another time sequence relationship between data feedback and retransmission in an application scenario in this application. Details are as follows:

A base station sends scheduling information A to first UE in an $n^{th}$ subframe, where the scheduling information A may be specifically DCI; and assigns resources for two transmissions on a sidelink to the first UE based on content indicated by the DCI. To be specific, the two transmissions correspond to a first transmission on a sidelink and a second transmission on the sidelink in the figure. The first transmission is performed in an $(n+4)^{th}$ subframe, and there is an interval of k subframes between the two transmissions. In this case, the second transmission is performed in an $(n+4+k)^{th}$ subframe. In an $(n+8+k)^{th}$ subframe, the first UE attempts to receive sidelink feedback information sent by second UE. In an $(n+12+k)^{th}$ subframe, the base station attempts to receive UL feedback information from the first UE. If the UL feedback information indicates that retransmission needs to be performed currently, the base station sends scheduling information B to the first UE in an $(n+16+k)^{th}$ subframe. The scheduling information B may also be specifically DCI, and the scheduling information B is used to assign a retransmission resource to the first UE. In an $(n+20+k)^{th}$ subframe, the first UE performs a first transmission (corresponding to a third transmission on the sidelink in the figure) during the retransmission on the sidelink.

It should be noted that a time interval between a time at which the first UE receives the scheduling information A and a time for the first data transmission during initial transmission is not limited to four subframes, and a time interval between a time at which the first UE receives the scheduling information B and a time for the first data transmission during the retransmission is not limited to four subframes. Alternatively, there may be other time units than the subframe, for example, a slot, a symbol, or another time unit including several symbols. This is not limited herein. It may be understood that the k subframes between the two transmissions may be set based on an actual case, where k is a positive integer. In addition, an interval between the UL feedback information and the DCI is not limited to four subframes, and may be another quantity of subframes. This is not limited herein.

The base station configures a corresponding resource for the first UE. The resource may be at least one of a time domain resource, a frequency domain resource, and a code domain resource, and the resource is used by the first UE to send the UL feedback information. It should be noted that the base station may configure the resource by using at least one of a system broadcast message, radio resource control (RRC) dedicated signaling, media access control (MAC) layer signaling, physical layer signaling, and the like; or may determine the resource by using a smallest or largest sequence number in control channel elements (CCE) occupied by the DCI sent in the subframe n. The CCE is a resource granularity of a PDCCH. In addition, a combination of the two manners may be used. This is not limited herein.

More specifically, the first UE may send the UL feedback information to the base station in a $t_1^{th}$ subframe that is after a last transmission of the first UE, where $t_1$ is a positive integer. When delivering the scheduling information A in the subframe n, the base station already knows that a subframe used by the first UE to send the UL feedback information is an $(n+t_1+t_2)^{th}$ subframe, where $t_2$ indicates that the last transmission of the first UE occurs in a $t_2^{th}$ subframe that is after the subframe n; and receives, in the $(n+t_1+t_2)^{th}$ subframe, the UL feedback information sent by the first UE. The UL feedback information indicates whether the transmission on the sidelink succeeds. The second UE receives SCI from the first UE. By using the SCI, the second UE may determine a subframe for giving uplink feedback, and gives corresponding feedback.

In addition, in this embodiment of this application, after attempting to receive feedback from the second UE on the sidelink, the first UE gives feedback to the base station, so that the base station can learn whether the transmission of the first UE on the sidelink succeeds. If the transmission does not succeed, the base station may assign the retransmission resource to the first UE. In the foregoing manner, the second UE first feeds back, to the first UE, whether the data is received, so that the first UE learns of a data receiving status of the second UE more quickly, and accordingly it is advantageous to choose, by using the first UE, whether to retransmit the data, thereby improving operability and practicability of the solution.

Optionally, based on the foregoing embodiment corresponding to FIG. 6, in a second optional embodiment of the data transmission method provided in this embodiment of this application, the second scheduling information includes downlink feedback information, and that the first UE receives the second scheduling information sent by the base station may include:

the base station sends the downlink feedback information to the first UE, and the first UE receives the downlink feedback information sent by the base station; and the first UE determines the first scheduling information based on the downlink feedback information, where the first scheduling information is used to instruct the first UE to resend the data to the second UE.

That the first UE receives the second scheduling information sent by the base station may include:

the first UE receives the downlink feedback information sent by the base station, where the downlink feedback information is used to instruct the first UE to resend the data to the second UE based on the first scheduling information.

In this embodiment, the second scheduling information that is sent by the base station and received by the first UE may be DCI, or may be DL feedback information. To reduce signaling overheads, if the first UE receives the DL feedback information, the first UE may determine to resend the data to the second UE based on the first scheduling information. In other words, in this case, content of the second scheduling information is the same as content of the first scheduling information. Therefore, the base station does not need to send the first scheduling information to the first UE again.

Figure 10:
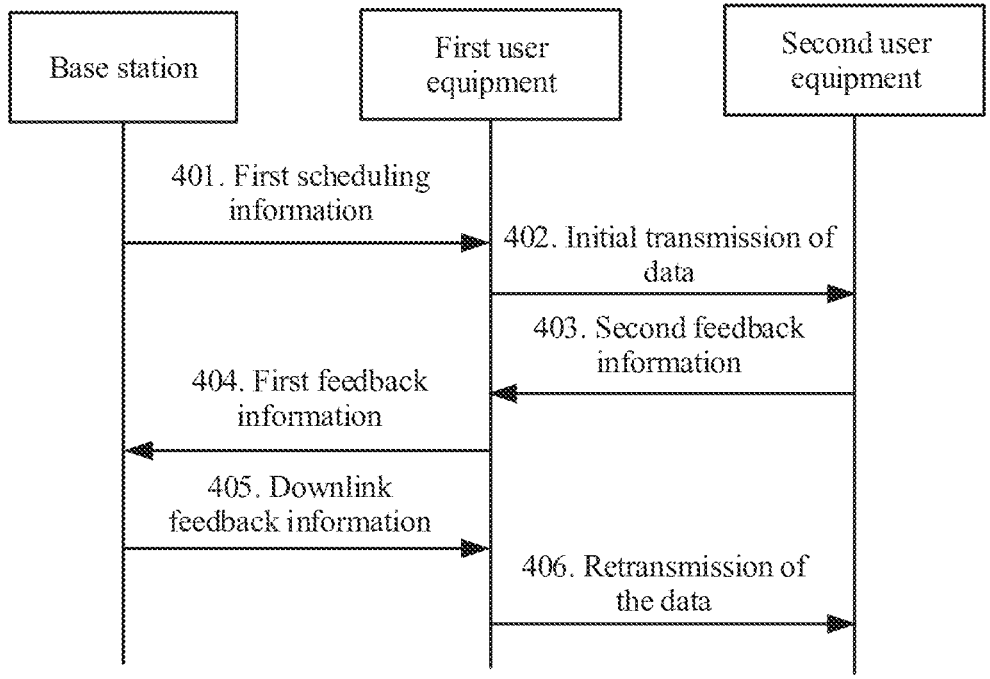
FIG. 10 is a schematic diagram of another embodiment of a data transmission method according to an embodiment of this application.

Specifically, FIG. 10 is a schematic diagram of another embodiment of a data transmission method according to an embodiment of this application. As shown in the figure, step 401 to step 404 are similar to step 301 to step 304 in the foregoing embodiment corresponding to FIG. 8. Therefore, details are not described herein.

In step 405, the base station sends DL feedback information to the first UE. In this case, it may be determined, based on the DL feedback information, that a frequency domain resource, a quantity of transmissions, a time domain interval between transmissions, an MCS, and the like that are used for retransmission are the same as those used for initial transmission. Therefore, indication does not need to be performed again by using the second scheduling information. After receiving the DL feedback information, the first UE still uses the first scheduling information for the initial transmission to perform retransmission on a sidelink.

However, in step 305 in the embodiment corresponding to FIG. 8, after learning that the data needs to be retransmitted, the base station sends the second scheduling information to the first UE. The second scheduling information is specifically DCI, and the second scheduling information is used to assign a retransmission resource to the first UE. In this case, a frequency domain resource, a quantity of transmissions, a time domain interval between two transmissions, an MCS, and the like that are used for retransmission may be different from those used for initial transmission, and the first UE performs retransmission on a sidelink according to an indication of the retransmitted DCI. The second scheduling information is different from the first scheduling information if the retransmission resource is different from an initial transmission resource.

With reference to step 306 in the embodiment corresponding to FIG. 8 and the schematic diagram of the time sequence relationship between data feedback and retransmission corresponding to FIG. g, the second UE does not combine the initially transmitted data (to be specific, in the first transmission and the second transmission) and the retransmitted data (in the third transmission) because the resources used for the initial transmission and the retransmission may be different but the second UE does not know a relationship between the initial transmission resource and the retransmission resource. In this manner, a redundancy version (RV) of the retransmitted data needs to be recalculated from the beginning. In a conventional LTE system, RVs are 0, 2, 3, and 1 in a cycle. In this application, the RV mechanism described above is used. For example, RVs of the two transmissions during the initial transmission are 0 (the first transmission) and 2 (the second transmission), respectively. In this case, an RV of the first transmission during the retransmission is 0 (the third transmission), and a redundancy version is 2 (a fourth transmission) if there is a second transmission.

However, in step 406 in this embodiment, SCI sent by the first UE includes a piece of identification (ID) information, and a same ID is used during the initial transmission and the retransmission. Accordingly, the second UE can combine the initially transmitted data and the retransmitted data based on the ID. More specifically, the ID may be assigned by the base station to the first UE, for example, is included in the first scheduling information, where the first scheduling information may be specifically DCI; or may be sent by using RRC dedicated signaling or MAC layer signaling; or may be selected by the first UE itself. It may be understood that, in actual application, the ID may be further used to indicate a relationship between the first UE on a transmit side and the second UE on a receive side. For example, an ID 1 is used for communication between the first UE and the second UE, and an ID 2 is used for communication between third UE and fourth UE. In this way, the ID may also play a filtering role. For example, if SCI received by the second UE includes an ID 1, the second UE continues to attempt to demodulate or decode corresponding data. If SCI received by the second UE includes an ID 2, the second UE does not continue to attempt to demodulate or decode corresponding data. In this manner, an RV of the retransmitted data may continue to be calculated following redundancy versions of the initial transmission. For example, redundancy versions of the two transmissions during the initial transmission are 0 (the first transmission) and 2 (the second transmission), respectively. In this case, a redundancy version of the first transmission during the retransmission is 3 (the third transmission), and a redundancy version is 1 (a fourth transmission) if there is a second transmission.

In addition, in this embodiment of this application, when receiving the downlink feedback information sent by the base station, the first UE considers that an MCS and the like that are used for retransmitting the data are consistent with an MCS and the like that are used for initially transmitting the data, accordingly determines the first scheduling information based on the downlink feedback information, and retransmits the data to the second UE based on the first scheduling information. In the foregoing manner, if the MCS and the like that are used for retransmitting the data are consistent with the MCS and the like that are used for initially transmitting the data, the base station does not need to transmit the second scheduling information, but uses the first scheduling information corresponding to the initial transmission resource to instruct the first UE to perform retransmission on the sidelink, thereby improving flexibility and practicability of the solution. Proper solutions are provided for different scenarios to increase feasibility of the solution.

Optionally, based on FIG. 6 and the first or second embodiment corresponding to FIG. 6, in a third optional embodiment of the data transmission method provided in this embodiment of this application, that a base station sends first scheduling information to first UE may include:

the base station sends, to the first UE, the first scheduling information that includes indication information, and the first UE receives the first scheduling information that includes the indication information, where the indication information is used to indicate that the data is data that can be retransmitted; or the base station sends, to the first UE, the first scheduling information that is processed by using a scrambling identifier, and the first UE receives the first scheduling information that is processed by using the scrambling identifier, where the scrambling identifier is used to indicate that the data is data that can be retransmitted.

In this embodiment, there is no feedback and retransmission on the sidelink for some data sent by the first UE on the transmit side, namely, non-retransmitted data, such as broadcast data. There is feedback and/or retransmission on the sidelink for some other data, namely, data that can be retransmitted, such as unicast data and multicast data. The second UE on the receive side has different processing manners for different data. For example, for broadcast data, the second UE does not need to consider feedback and a combination of initially transmitted data and retransmitted data. For unicast data and multicast data, the second UE may need to give feedback and/or perform combination. Therefore, data with retransmission and data without retransmission need to be distinguished during receiving.

How the base station indicates different data types is first described below. This embodiment provides two feasible manners, which are specifically as follows:

In a first manner of indicating a data type, the base station sends DCI to the first UE on the transmit side. The DCI is used to indicate whether there may be feedback and retransmission for data on the sidelink. If there is no feedback and retransmission for the data on the sidelink, the data type is a data type A, and the data may be specifically broadcast data or the like. On the contrary, if there may be feedback and/or retransmission for the data on the sidelink, the data type is a data type B, and the data may be specifically multicast data, unicast data, or the like. If the data type is the data type B, the base station needs to attempt to receive uplink feedback from the first UE or the second UE.

In a second manner of indicating a data type, the base station scrambles DCI by using different scrambling identifiers. For example, the DCI scrambled by using a scrambling identifier 1 is used to indicate a data type A, and data of the data type A may be specifically broadcast data or the like. The DCI scrambled by using a scrambling identifier 2 is used to indicate a data type B, and data of the data type B may be specifically multicast data, unicast data, or the like. The scrambling identifier may be assigned by the base station, for example, by using RRC dedicated signaling. A manner of assigning the scrambling identifier is not limited herein. Specifically, the scrambling identifier is used to scramble cyclic redundancy check (CRC) bits of the DCI.

The scrambling identifier may be specifically a radio network temporary identifier (RNTI). The RNTI is an identifier assigned by the base station to the UE. The identifier may be preconfigured on the UE, or may be predefined.

How the first UE and the second UE distinguish between data types and process data is described below. This embodiment provides two feasible manners, which are specifically as follows:

In a first manner of distinguishing between different data types and processing data, the first UE and the second UE distinguish between data types by using different resource pools, for example, a resource pool specially used to send a data type B is configured. The resource pool may be configured by using the base station. For example, the resource pool may be configured by using a system broadcast message, RRC dedicated signaling, or the like. Alternatively, the resource pool may be preconfigured on the first UE and the second UE. It should be noted that, in actual application, one resource pool may be configured, or a plurality of resource pools may be configured. The second UE on the receive side receives data in the resource pool; and when correctly receiving SCI but incorrectly receiving the data, may attempt to combine the initially transmitted data and the retransmitted data.

In a second manner of distinguishing between different data types and processing data, the first UE adds a piece of indication information to SCI for distinguishing. In a possible implementation, the indication information may be one bit. For example, when the bit is "0", it indicates that the data is of a data type A. When the bit is "1", it indicates that the data is of a data type B. The second UE on the receive side may distinguish between the two data types by using the indication information in the SCI, and then perform different operations. For example, when the indication information indicates the data type B, if the second UE correctly receives the SCI but incorrectly receives the data, the second UE may attempt to combine the initially transmitted data and the retransmitted data. The indication information may be indicated by the base station to the first UE; or may be determined by a higher layer of the first UE, and is notified to a physical layer. It may be understood that if the second UE on the receive side does not combine the data of the data type B, the second UE may send data of the two types in one resource pool without distinguishing.

It should be noted that, in actual application, when the bit of the indication information is "0", it may indicate that the data is of the data type B; and when the bit of the indication information is "1", it indicates that the data is of the data type A. This is merely an example herein, and should not be construed as a limitation on this application.

In addition, in this embodiment of this application, the base station sends, to the first UE, the first scheduling information that includes the indication information, or the base station sends, to the first UE, the first scheduling information that is processed by using the scrambling identifier. In the foregoing manner, the base station uses different scrambling identifiers or indication information to enable the first UE on the transmit side to learn, more clearly, that the DCI assigned by the base station is used to transmit data of which type, to avoid inconsistency in data transmission between the first UE and the base station and further improve reliability of the solution. In addition, the first UE may use a dedicated resource pool or add the indication information to the SCI, to distinguish whether the data may be retransmitted, so that the second UE on the receive side may learn which data may be retransmitted, and then may consider performing a combination operation, thereby improving practicability of the solution.

Optionally, based on the foregoing embodiment corresponding to FIG. 6, in a fourth optional embodiment of the data transmission method provided in this embodiment of this application, that a base station sends first scheduling information to first user equipment UE includes:

the base station indicates, to the first UE, a resource used for initial transmission and a resource used for retransmission, so that the first UE can resend the data to the second UE without sending the first feedback information to the base station.

In step 201 in FIG. 6, the base station first sends, to the first UE, the first scheduling information used to indicate an initial transmission resource. If the second UE fails to correctly receive the data, in step 204, the base station further sends, to the first UE, the second scheduling information used to indicate a retransmission resource. In this embodiment, the base station directly indicates the resource used for initial transmission and the resource used for retransmission together, so that in a process in which the first UE performs transmission a plurality of times, the first UE does not need to send the first feedback information to the base station to request the retransmission resource.

Figure 11:
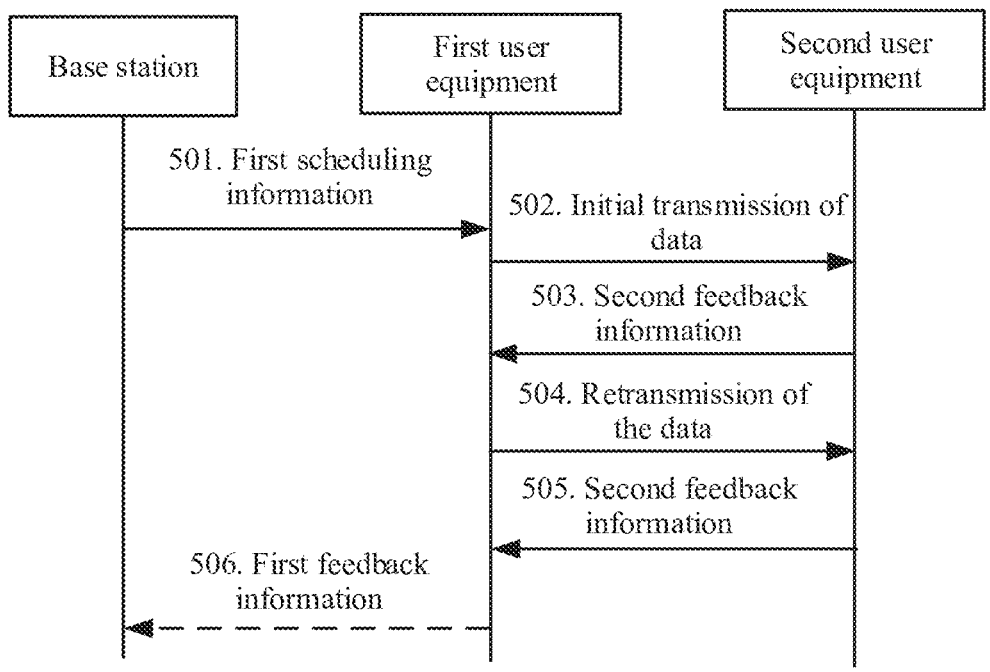
FIG. 11 is a schematic diagram of another embodiment of a data transmission method according to an embodiment of this application.

Specifically, FIG. 11 is a schematic diagram of another embodiment of a data transmission method according to an embodiment of this application. As shown in the figure, in step 501, a base station sends first scheduling information to first UE. The first scheduling information is used to assign an initial transmission resource and a retransmission resource to the first UE, and instruct the first UE to send to-be-initially-transmitted data to second UE by using the initial transmission resource in step 502. The first UE sends the to-be-initially-transmitted data to the second UE in step 502. If the second UE fails to receive the data sent by the first UE, the second UE sends second feedback information to the first UE in step 503 to notify the first UE that the current data fails to be received. Accordingly, in step 504, the first UE retransmits the data to the second UE by using the retransmission resource. In step 505, the first UE attempts to receive the second feedback information sent by the second UE, to determine whether the data needs to be retransmitted. Particularly, if the first UE fails to receive the second feedback information sent by the second UE, it is also considered that the data is not correctly received, and the data needs to be retransmitted. Finally, the first UE may choose whether first feedback information needs to be sent to the base station in step 506.

It may be understood that, in step 501, the base station sends, to the first UE, the first scheduling information used to assign the resources, and a specific implementation of step 501 may be as follows:

In a first possible implementation, the base station may assign only a small quantity of retransmission resources, for example, assign retransmission resources (such as a resource required for a third data transmission and a resource required for a fourth data transmission) only once. It is assumed that the first UE receives feedback from the second UE after initially transmitting the data (to be specific, after a resource required for a second data transmission), and the feedback indicates that the data is correctly received. In this case, the first UE does not need to send the first feedback information to the base station.

If the data is still not correctly transmitted after the resources for the first UE are used up, the method described in the foregoing embodiment corresponding to FIG. 6 may be used to continue to send the first feedback information to the base station to request data retransmission.

In a second possible implementation, the base station may assign a relatively large quantity of retransmission resources to the first UE. It is assumed that retransmission resources (such as a resource required for a third data transmission to a resource required for a sixteenth data transmission) are assigned seven times, the first UE receives feedback from the second UE after a first retransmission (to be specific, after a resource required for a fourth data transmission), and the feedback indicates that the data is correctly received. In this case, the first UE sends the first feedback information to the base station to notify the base station that the data is successfully sent, and releases all or some unused resources (all the unused resources may include a resource required for a fifth data transmission to the resource required for the sixteenth data transmission). The base station may assign the unused resources to another UE for use.

If the data is still not correctly transmitted after the resources for the first UE are used up, the method described in the foregoing embodiment corresponding to FIG. 6 may be used to continue to send the first feedback information to the base station to request data retransmission.

It should be noted that a quantity of resources assigned by the base station or a quantity of transmissions may be configured by the base station, for example, by using a system broadcast message, RRC dedicated signaling, MAC layer signaling, or physical layer signaling; or may be preconfigured on the first UE. This is not limited herein.

Figure 12:
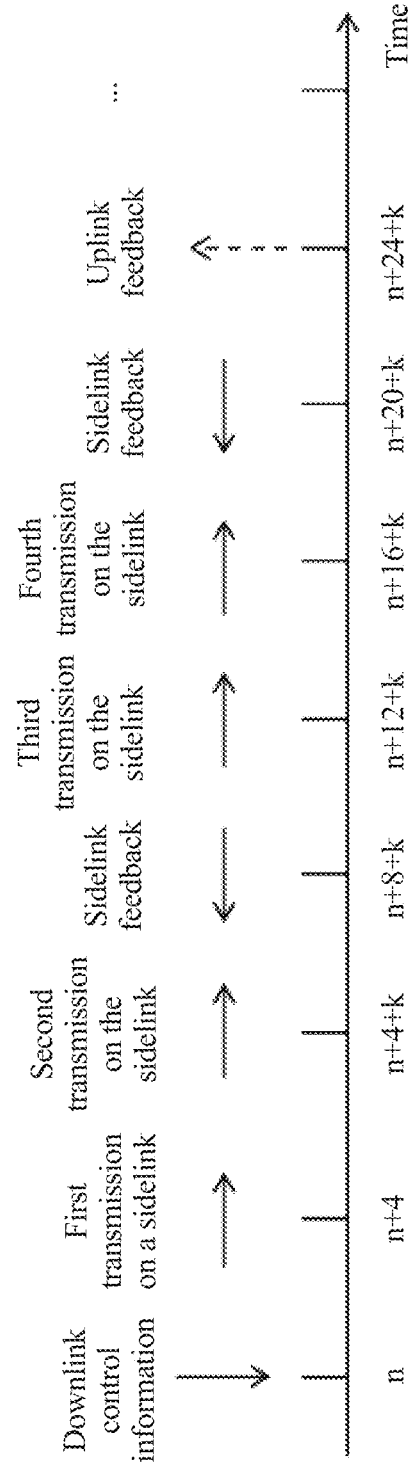
FIG. 12 is a schematic diagram of another time sequence relationship between data feedback and retransmission in an application scenario in this application.

For ease of understanding, a data transmission method in an embodiment of this application is described below in detail by using a specific application scenario as an example. FIG. 12 is a schematic diagram of another time sequence relationship between data feedback and retransmission in an application scenario in this application. Details are as follows:

A base station sends first scheduling information to first UE in an $n^{th}$ subframe, where the first scheduling information may be specifically DCI; and assigns an initial transmission resource and a retransmission resource on a sidelink to the first UE based on content indicated by the DCI. Initial transmission includes two transmissions, a first transmission is performed in an $(n+4)^{th}$ subframe, and there is an interval of k subframes between the two transmissions. In this case, a second transmission is performed in an $(n+4+k)^{th}$ subframe. In an $(n+8+k)^{th}$ subframe, the first UE may attempt to receive sidelink feedback information sent by second UE. If retransmission is required, the first UE performs two transmissions (corresponding to a third transmission on the sidelink and a fourth transmission on the sidelink in the figure) during the retransmission on the sidelink in an $(n+12+k)^{th}$ subframe and an $(n+16+k)^{th}$ subframe. If retransmission is not required, optionally, the first UE may further send first feedback information, namely, UL feedback information, to the base station.

It should be noted that a time interval between a time at which the first UE receives scheduling information A and a time for the first data transmission during the initial transmission is not limited to four subframes, and a time interval between a time at which the first UE receives scheduling information B and a time for a first data transmission during the retransmission is not limited to four subframes. Alternatively, there may be other time units than the subframe, for example, a slot, a symbol, or another time unit including several symbols. This is not limited herein. It may be understood that the k subframes between the two transmissions may be set based on an actual case, where k is a positive integer. In addition, an interval between the UL feedback information and the DCI is not limited to four subframes, and may be another quantity of subframes. This is not limited herein.

The base station configures a corresponding resource for the first UE. The resource may be at least one of a time domain resource, a frequency domain resource, and a code domain resource, and the resource is used by the first UE to send the UL feedback information. It should be noted that the base station may configure the resource by using at least one of a system broadcast message, RRC dedicated signaling, MAC layer signaling, physical layer signaling, and the like; or may determine the resource by using a smallest or largest sequence number in CCEs occupied by the DCI sent in the subframe n. The CCE is a resource granularity of a PDCCH. In addition, a combination of the two manners may be used. This is not limited herein.

More specifically, the first UE may send the UL feedback information to the base station in a $t_1^{th}$ subframe that is after a last transmission of the first UE, where $t_1$ is a positive integer. When delivering the scheduling information A in the subframe n, the base station already knows that a subframe used by the first UE to send the UL feedback information is an $(n+t_1+t_2)^{th}$ subframe, where $t_2$ indicates that the last transmission of the first UE occurs in a $t_2^{th}$ subframe that is after the subframe n; and receives, in the $(n+t_1+t_2)^{th}$ subframe, the UL feedback information sent by the first UE. The UL feedback information indicates whether the transmission on the sidelink succeeds. The second UE receives SCI from the first UE. By using the SCI, the second UE may determine a subframe for giving uplink feedback, and gives corresponding feedback.

Further, in this embodiment of this application, the base station may directly indicate, to the first UE, the resource used for initial transmission and the resource used for retransmission, so that in a process in which the first UE performs transmission a plurality of times, the first UE can resend the data to the second UE without requiring the first UE to send the first feedback information to the base station. In the foregoing manner, in a case of the data retransmission, the base station may not need to deliver scheduling information to the first UE a plurality of times, but the first UE directly retransmits the data to the second UE, thereby further reducing signaling overheads and delays.

Optionally, based on the fourth embodiment corresponding to FIG. 6, in a fifth optional embodiment of the data transmission method provided in this embodiment of this application, the method may further include:

the second UE receives retransmitted SCI and the retransmitted data based on initially transmitted SCI; or the second UE determines a resource location of retransmitted SCI based on a resource location of initially transmitted SCI; or the second UE determines a resource location of retransmitted SCI based on indication information included in initially transmitted SCI.

In this embodiment, it indicates that in different cases, there may be specifically the following three resource assignment manners for the base station and the UE:

In a first resource assignment manner, FIG. 7 is used as an example, and it is assumed that scheduling information (such as a frequency domain resource, a quantity of transmissions, a time domain interval, and an MCS) for each retransmission (such as a third data transmission and a fourth data transmission) is always the same as scheduling information for initial transmission (such as a first data transmission and a second data transmission). In this case, the base station needs to indicate only the scheduling information for the initial transmission to the first UE. For example, the base station sends only the first scheduling information, and the first UE uses the first scheduling information again during the retransmission. The first scheduling information may be DCI. In this manner, the second UE may not combine the initially transmitted data and the retransmitted data; or an ID may be added to SCI sent by the first UE, so that the second UE combines the initially transmitted data and the retransmitted data based on the ID. In addition, the same scheduling information is always used for the initially transmitted data and the retransmitted data of the first UE, and the first UE includes the scheduling information in the SCI. Therefore, the second UE may combine the corresponding initially transmitted data and the corresponding retransmitted data based on the received SCI. For example, during the initial transmission, the second UE correctly receives only the SCI, but fails to correctly receive the data (for example, in the first data transmission and the second data transmission). In this case, the second UE may learn of, based on information about the SCI, scheduling information corresponding to retransmitted SCI and the retransmitted data, for example, a resource location, a quantity of transmissions, a time interval, and an MCS; and then the second UE may combine the initially transmitted data and the retransmitted data.

In a second resource assignment manner, FIG. 7 is used as an example, and it is assumed that a frequency domain resource used for SCI in a first transmission during each retransmission is the same as a frequency domain resource used for SCI in a first transmission during initial transmission (for example, a frequency domain resource for SCI in a first data transmission is the same as a frequency domain resource for SCI in a third data transmission). In this case, the base station needs to indicate scheduling information for each transmission (the initial transmission and each retransmission) to the first UE, for example, by using DCI, MAC layer signaling, or RRC dedicated information. In this manner, the second UE may not combine the initially transmitted data and the retransmitted data; or an ID may be included in SCI sent by the first UE, so that the second UE performs combination based on the ID. In addition, because the frequency domain resources for the SCI in the first transmissions in the initially transmitted data and the retransmitted data of the first UE are the same, the second UE may combine the corresponding initially transmitted data and the corresponding retransmitted data based on the received SCI. For example, when the data is initially transmitted, the second UE correctly receives only the SCI in the first transmission, but fails to correctly receive the data (for example, in a first data transmission and a second data transmission). In this case, the second UE may learn of, based on a frequency domain resource location of the SCI, a frequency domain resource location corresponding to the SCI in the first transmission during the retransmission, therefore obtain the corresponding retransmitted data based on the SCI, and then may combine the initially transmitted data and the retransmitted data.

In a third resource assignment manner, FIG. 7 is used as an example, and there may be no association relationship between scheduling information for each retransmission and scheduling information for initial transmission. The base station needs to indicate scheduling information for each transmission (the initial transmission and each retransmission) to the first UE, for example, by using DCI, MAC layer signaling, or RRC dedicated information. In this manner, the second UE may not combine the initially transmitted data and the retransmitted data; or an ID may be included in SCI sent by the first UE, so that the second UE combines the initially transmitted data and the retransmitted data based on the ID. In addition, the first UE may indicate, by using the SCI, a frequency domain resource location of SCI in a first transmission during a next retransmission, so that the second UE can combine the initially transmitted data and the retransmitted data based on the SCI. For example, during the initial transmission, the second UE correctly receives only the SCI in the first transmission, but fails to correctly receive the data (for example, in a first data transmission and a second data transmission). In this case, because the SCI indicates the frequency domain resource location of the SCI in the first transmission during the next retransmission, the second UE may determine the SCI for the corresponding retransmitted data based on the frequency domain resource location of the SCI, therefore obtain the corresponding retransmitted data based on the SCI, and then may combine the initially transmitted data and the retransmitted data.

It should be noted that the resources in this embodiment include the resource for the SCI and the resource for the data.

Further, in this embodiment of this application, when indicating, to the first UE, the resource used for initial transmission and the resource used for retransmission, the base station may further consider processing manners in three common cases: the retransmission resource is completely the same as the initial transmission resource, or the frequency domain resource for the SCI in the first transmission during the retransmission is the same as the frequency domain resource for the SCI in the first transmission during the initial transmission, or there is no association relationship between the retransmission resource and the initial transmission resource, thereby implementing data feedback and retransmission on the sidelink. In addition, the base station may directly assign the initial transmission resource and the retransmission resource to the first UE, to further reduce signaling overheads and delays.

Optionally, based on any one of FIG. 6 and the first to the fifth embodiments corresponding to FIG. 6, in a sixth optional embodiment of the data transmission method provided in this embodiment of this application, the method may be further applied to a semi-persistent scheduling (SPS) scenario.

In this embodiment, the data transmission method may be applied to the SPS scenario. A dynamic scheduling manner is basically used in an LTE system. However, in a Voice over Internet Protocol (VoIP) service, a data packet is relatively small, a control channel occupies a large quantity of resources, and accordingly a voice service capacity is greatly affected. In consideration of this case, the LTE system also supports SPS, to increase the voice service capacity and reduce overheads of the control channel.

The LTE system may notify a terminal of SPS information by using RRC signaling, where content includes an SPS period and a related parameter of semi-persistent scheduling; and then notify, through a PDCCH channel, the terminal when to start semi-persistent scheduling. The terminal in a semi-persistent scheduling state also monitors a PDCCH scheduling command at any time, and can use dynamic scheduling at any time to increase a transmission rate, to cope with burst traffic that may be brought by another data service when the VOIP service is performed.

It may be understood that, in this embodiment of this application, the first scheduling information may indicate an SPS resource, and may also indicate the initial transmission resource and the retransmission resource.

Figure 13:
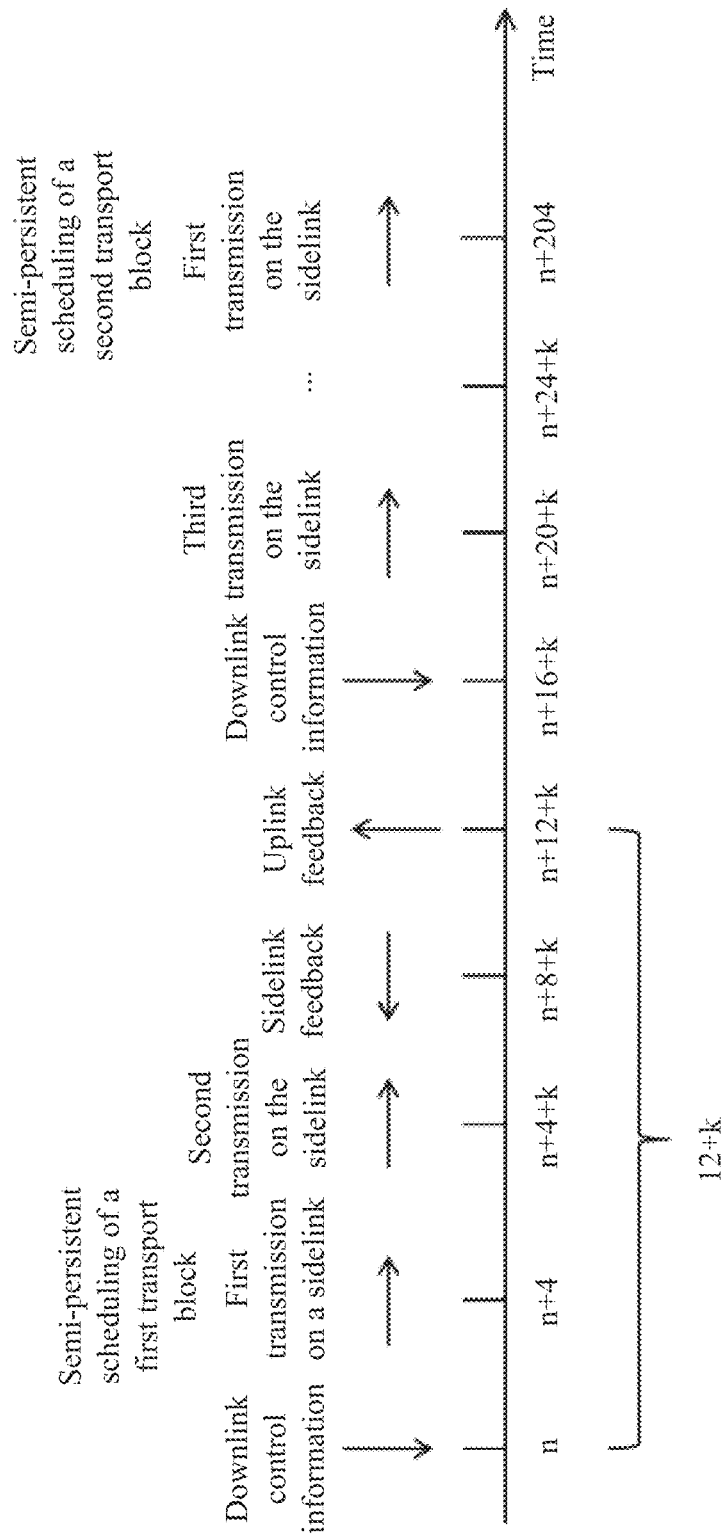
FIG. 13 is a schematic diagram of a time sequence relationship between data feedback and retransmission in an application scenario of semi-persistent scheduling in this application.

For ease of understanding, a data transmission method in an embodiment of this application is described below in detail by using a specific application scenario as an example. FIG. 13 is a schematic diagram of a time sequence relationship between data feedback and retransmission in an application scenario of semi-persistent scheduling in this application. Details are as follows:

A base station sends first scheduling information, namely, DCI, to first UE in an $n^{th}$ subframe. The DCI indicates an SPS resource. It is assumed that one period is 200 milliseconds, to be specific, a transmission time interval corresponding to two SPS TBs is 200 milliseconds. As shown in the figure, to be specific, a first transmission of a first SPS TB occurs in an $(n+4)^{th}$ subframe, a first transmission of a second SPS TB occurs in an $(n+204)^{th}$ subframe, and a time interval between the two SPS TBs is one period.

It may be understood that for feedback and retransmission for each SPS TB, the method described in any one of FIG. 6 and the first to the fifth embodiments corresponding to FIG. 6 may be used. Therefore, details are not described herein.

Further, in this embodiment of this application, link data feedback and retransmission may be further extended to the SPS scenario based on scheduling by the base station, thereby enhancing practicability and flexibility of the solution. Therefore, a proper scenario may be selected based on an actual case to transmit data, to further improve properness of the solution.

Figure 14:
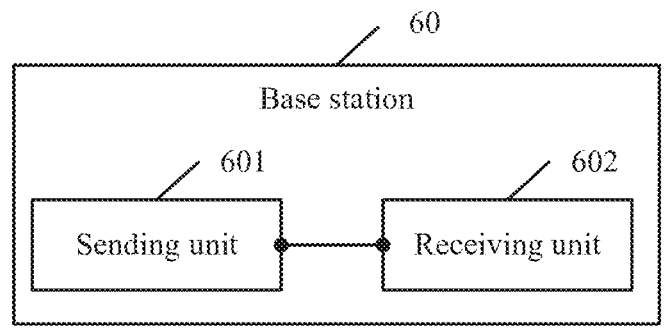
FIG. 14 is a schematic diagram of an embodiment of a base station according to an embodiment of this application.

A base station corresponding to an embodiment of this application is described below in detail. Referring to FIG. 14, a base station 60 in this embodiment of this application includes:

a sending unit 601, configured to send first scheduling information to first UE, where the first scheduling information is used to instruct the first UE to send data to second UE based on the first scheduling information sent by the sending unit; and a receiving unit 602, configured to receive first feedback information sent by the first UE, where the first feedback information is used to indicate whether the second UE successfully receives the data.

If the first feedback information received by the receiving unit 602 indicates that the second UE fails to receive the data, the sending unit 601 is further configured to send second scheduling information to the first UE, where the second scheduling information is used to instruct the first UE to resend the data to the second UE.

In this embodiment, the sending unit 601 sends the first scheduling information to the first UE, where the first scheduling information is used to instruct the first UE to send the data to the second UE based on the first scheduling information sent by the sending unit. The receiving unit 602 receives the first feedback information sent by the first UE, where the first feedback information is used to indicate whether the second UE successfully receives the data. If the first feedback information received by the receiving unit 602 indicates that the second UE fails to receive the data, the sending unit 601 is further configured to send the second scheduling information to the first UE, where the second scheduling information is used to instruct the first UE to resend the data to the second UE.

In a technical solution of this embodiment of this application, the base station for data transmission is provided. First, the base station sends the first scheduling information to the first UE, where the first scheduling information is used to instruct the first UE to send the data to the second UE. Then the base station receives the first feedback information sent by the first UE, where the first feedback information is used to indicate whether the second UE successfully receives the data. The base station sends the second scheduling information to the first UE if the first feedback information indicates that the second UE fails to receive the data, where the second scheduling information is used to instruct the first UE to resend the data to the second UE. In the foregoing manner, the base station may determine a data receiving status of the second UE by receiving the first feedback information, so that the first UE requests, from the base station, a resource used for data retransmission, thereby improving reliability of data transmission between the two UEs.

Optionally, based on the foregoing embodiment corresponding to FIG. 14, in another embodiment of the base station provided in this embodiment of this application, the first feedback information is determined by the first UE based on second feedback information, and the second feedback information is sent by the second UE to the first UE.

In addition, in this embodiment of this application, after attempting to receive feedback from the second UE on a sidelink, the first UE may give feedback to the base station, so that the base station can learn whether the transmission of the first UE on the sidelink succeeds. If the transmission does not succeed, the base station may assign a retransmission resource to the first UE. In the foregoing manner, the second UE first feeds back, to the first UE, whether the data is received, so that the first UE learns of a data receiving status of the second UE more quickly, and accordingly it is advantageous to choose, by using the first UE, whether to retransmit the data, thereby improving operability and practicability of the solution.

Optionally, based on the foregoing embodiment corresponding to FIG. 14, in another embodiment of the base station provided in this embodiment of this application, that the second scheduling information is used to instruct the first UE to resend the data to the second UE may specifically include:

the second scheduling information is used to instruct the first UE to resend the data to the second UE based on the second scheduling information.

In addition, in this embodiment of this application, the second scheduling information may directly instruct the first UE to resend the data to the second UE, and a difference from the first scheduling information is that the second scheduling information may indicate a resource different from the first scheduling information, thereby increasing flexibility and feasibility of data transmission.

Optionally, based on the foregoing embodiment corresponding to FIG. 14, in another embodiment of the base station provided in this embodiment of this application, the second scheduling information includes downlink feedback information.

That the sending unit 601 is further configured to send second scheduling information to the first UE includes:

the sending unit 601 is further configured to send the downlink feedback information to the first UE, where the downlink feedback information is used to instruct the first UE to resend the data to the second UE based on the first scheduling information.

In addition, in this embodiment of this application, when receiving the downlink feedback information sent by the base station, the first UE considers that a resource used for retransmitting the data is consistent with a resource used for initially transmitting the data, accordingly determines the first scheduling information based on the downlink feedback information, and retransmits the data to the second UE based on the first scheduling information. In the foregoing manner, if the resource used for retransmitting the data is consistent with the resource used for initially transmitting the data, the base station does not need to transmit the second scheduling information, but uses the first scheduling information corresponding to the initial transmission resource to instruct the first UE to perform retransmission on a sidelink, thereby improving flexibility and practicability of the solution. Proper solutions are provided for different scenarios to increase feasibility of the solution.

Optionally, based on the foregoing embodiment corresponding to FIG. 14, in another embodiment of the base station provided in this embodiment of this application, that a sending unit 601 is configured to send first scheduling information to first UE includes:

the sending unit 601 is configured to send, to the first UE, the first scheduling information that includes indication information, where the indication information is used to indicate that the data is data that can be retransmitted; or the sending unit 601 is configured to send, to the first UE, the first scheduling information that is processed by using a scrambling identifier, where the scrambling identifier is used to indicate that the data is data that can be retransmitted.

In addition, in this embodiment of this application, the base station sends, to the first UE, the first scheduling information that includes the indication information, or the base station sends, to the first UE, the first scheduling information that is processed by using the scrambling identifier. In the foregoing manner, the base station uses different scrambling identifiers or indication information to enable the first UE on a transmit side to learn, more clearly, that DCI assigned by the base station is used to transmit data of which type, to avoid inconsistency in data transmission between the first UE and the base station and further improve reliability of the solution. In addition, the first UE may use a dedicated resource pool or add indication information to SCI, to distinguish whether the data may be retransmitted, so that the second UE on a receive side may learn which data may be retransmitted, and then may consider performing a combination operation, thereby improving practicability of the solution.

Figure 15:
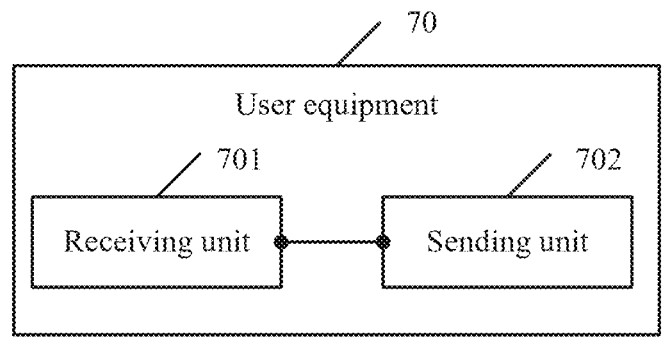
FIG. 15 is a schematic diagram of an embodiment of user equipment according to an embodiment of this application.

The base station in this application is described above. UE corresponding to an embodiment of this application is described below in detail. Referring to FIG. 15, UE 70 in this embodiment of this application includes:

a receiving unit 701, configured to receive first scheduling information sent by a base station, where the first scheduling information is used to instruct first UE to send data to second UE based on the first scheduling information; and a sending unit 702, configured to send first feedback information to the base station, where the first feedback information is used to indicate whether the second UE successfully receives the data.

If the first feedback information sent by the sending unit 702 indicates that the second UE fails to receive the data, the receiving unit 701 is further configured to receive second scheduling information sent by the base station, where the second scheduling information is used to instruct the first UE to resend the data to the second UE.

In this embodiment, the receiving unit 701 receives the first scheduling information sent by the base station, where the first scheduling information is used to instruct the first UE to send the data to the second UE based on the first scheduling information. The sending unit 702 sends the first feedback information to the base station, where the first feedback information is used to indicate whether the second UE successfully receives the data. If the first feedback information sent by the sending unit 702 indicates that the second UE fails to receive the data, the receiving unit 701 is further configured to receive the second scheduling information sent by the base station, where the second scheduling information is used to instruct the first UE to resend the data to the second UE.

In a technical solution of this embodiment of this application, the user equipment for data transmission is provided. First, the first UE receives the first scheduling information sent by the base station, where the first scheduling information is used to instruct the first UE to send the data to the second UE based on the first scheduling information. Then the first UE sends the first feedback information to the base station, where the first feedback information is used to indicate whether the second UE successfully receives the data. If the first feedback information indicates that the second UE fails to receive the data, the first UE receives the second scheduling information sent by the base station, where the second scheduling information is used to instruct the first UE to resend the data to the second UE. In the foregoing manner, the base station may determine a data receiving status of the second UE by receiving the first feedback information, so that the first UE requests, from the base station, a resource used for data retransmission, thereby improving reliability of data transmission between the two UEs.

Figure 16:
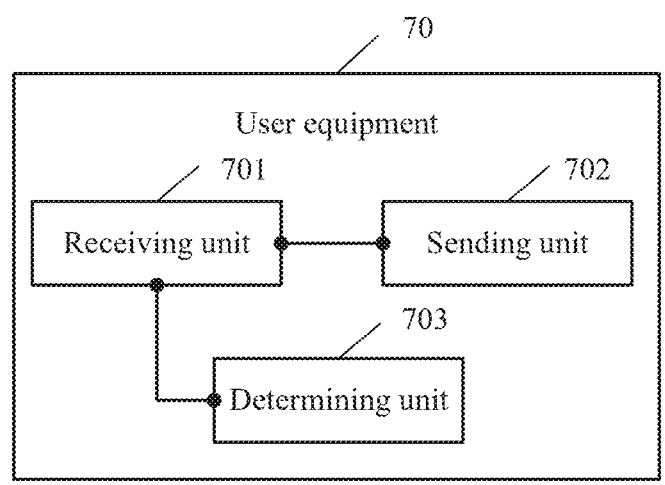
FIG. 16 is a schematic diagram of another embodiment of user equipment according to an embodiment of this application.

Optionally, based on the foregoing embodiment corresponding to FIG. 15, referring to FIG. 16, in another embodiment of the UE provided in this embodiment of this application, the UE 70 further includes:

the receiving unit 701 is further configured to: before the sending unit 702 sends the first feedback information to the base station, receive second feedback information sent by the second UE, where the second feedback information is used to indicate whether the second UE successfully receives the data; and a determining unit 703, configured to determine the first feedback information based on the second feedback information received by the receiving unit 701.

In addition, in this embodiment of this application, after attempting to receive the second feedback information from the second UE on a sidelink, the first UE may give feedback to the base station, so that the base station can learn whether the transmission of the first UE on the sidelink succeeds. If the transmission does not succeed, the base station may assign a retransmission resource to the first UE. In the foregoing manner, the second UE first feeds back, to the first UE, whether the data is received, so that the first UE learns of a data receiving status of the second UE more quickly, and accordingly it is advantageous to choose, by using the first UE, whether to retransmit the data, thereby improving operability and practicability of the solution.

Optionally, based on the foregoing embodiment corresponding to FIG. 15, in another embodiment of the user equipment provided in this embodiment of this application, that the second scheduling information is used to instruct the first UE to resend the data to the second UE may specifically include:

the second scheduling information is used to instruct the first UE to resend the data to the second UE based on the second scheduling information.

In addition, in this embodiment of this application, the second scheduling information may directly instruct the first UE to resend the data to the second UE, and a difference from the first scheduling information is that the second scheduling information may indicate a resource different from the first scheduling information, thereby increasing flexibility and feasibility of data transmission.

Optionally, based on the foregoing embodiment corresponding to FIG. 15, in another embodiment of the user equipment provided in this embodiment of this application, the second scheduling information includes downlink feedback information.

That the receiving unit 701 is further configured to receive second scheduling information sent by the base station includes:

the receiving unit 701 is further configured to receive the downlink feedback information sent by the base station, where the downlink feedback information is used to instruct the first UE to resend the data to the second UE based on the first scheduling information.

In addition, in this embodiment of this application, when receiving the downlink feedback information sent by the base station, the first UE considers that a resource used for retransmitting the data is consistent with a resource used for initially transmitting the data, accordingly determines the first scheduling information based on the downlink feedback information, and retransmits the data to the second UE based on the first scheduling information. In the foregoing manner, if the resource used for retransmitting the data is consistent with the resource used for initially transmitting the data, the base station does not need to transmit the second scheduling information, but uses the first scheduling information corresponding to the initial transmission resource to instruct the first UE to perform retransmission on a sidelink, thereby improving flexibility and practicability of the solution. Proper solutions are provided for different scenarios to increase feasibility of the solution.

Optionally, based on the foregoing embodiment corresponding to FIG. 15, in another embodiment of the user equipment provided in this embodiment of this application, that the receiving unit 701 is further configured to receive second scheduling information sent by the base station further includes:

the determining unit 703 is further configured to determine the first scheduling information based on the downlink feedback information after the receiving unit 701 receives the downlink feedback information sent by the base station, where the first scheduling information is used to instruct the first UE to resend the data to the second UE.

In addition, in this embodiment of this application, after receiving the downlink feedback information, the first UE may further determine the first scheduling information based on the downlink feedback information. In the foregoing manner, if the resource used for retransmitting the data is consistent with the resource used for initially transmitting the data, the base station does not need to transmit the second scheduling information, but uses the first scheduling information corresponding to the initial transmission resource to instruct the first UE to perform retransmission on a sidelink, thereby improving flexibility and practicability of the solution. In addition, it is advantageous to improve operability of the solution.

Optionally, based on the foregoing embodiment corresponding to FIG. 15, in another embodiment of the user equipment provided in this embodiment of this application, that a receiving unit 701 is configured to receive first scheduling information sent by a base station includes:

the receiving unit 701 is further configured to receive the first scheduling information that includes indication information and that is sent by the base station, where the indication information is used to indicate that the data is data that can be retransmitted; or the receiving unit 701 is further configured to receive the first scheduling information that is processed by using a scrambling identifier and that is sent by the base station, where the scrambling identifier is used to indicate that the data is data that can be retransmitted.

In addition, in this embodiment of this application, the base station sends, to the first UE, the first scheduling information that includes the indication information, or the base station sends, to the first UE, the first scheduling information that is processed by using the scrambling identifier. In the foregoing manner, the base station uses different scrambling identifiers or indication information to enable the first UE on the transmit side to learn, more clearly, that DCI assigned by the base station is used to transmit data of which type, to avoid inconsistency in data transmission between the first UE and the base station and further improve reliability of the solution. In addition, the first UE may use a dedicated resource pool or add indication information to SCI, to distinguish whether the data may be retransmitted, so that the second UE on a receive side may learn which data may be retransmitted, and then may consider performing a combination operation, thereby improving practicability of the solution.

Figure 17:
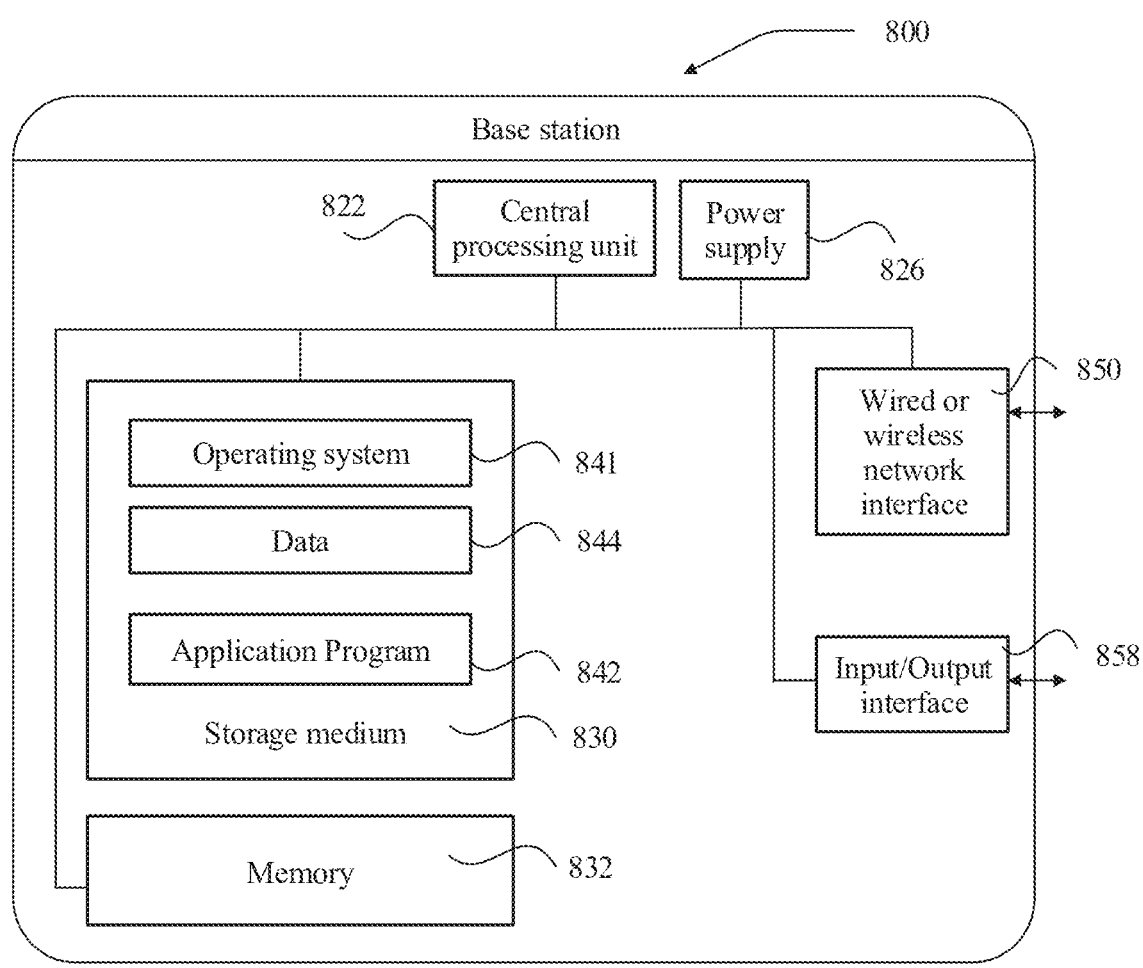
FIG. 17 is a schematic structural diagram of a base station according to an embodiment of this application.

FIG. 17 is a schematic structural diagram of a base station according to an embodiment of this application. Relatively great differences in the base station 800 may be generated because of configuration or performance differences. The base station 800 may include one or more central processing units (CPU) 822 (for example, one or more processors), one or more memories 832, and one or more storage media 830 (for example, one or more mass storage devices) for storing an application program 842 or data 844. The memory 832 and the storage medium 830 may be used for temporary storage or permanent storage. The program stored in the storage medium 830 may include one or more modules (not shown in the figure), and each module may include a series of instruction operations for a server. Further, the central processing unit 822 may be configured to communicate with the storage medium 830 to perform, on the server 800, a series of instruction operations in the storage medium 830.

The base station 800 may further include one or more power supplies 826, one or more wired or wireless network interfaces 850, one or more input/output interfaces 858, and/or one or more operating systems 841, such as Windows Server™, Mac OS X™, Unix™, Linux™, or FreeBSD™.

The steps performed by the base station in the foregoing embodiment may be based on a base station structure shown in FIG. 17.

The CPU 822 is configured to perform the following steps:

sending first scheduling information to first UE, where the first scheduling information is used to instruct the first UE to send data to second UE based on the first scheduling information;

receiving first feedback information sent by the first UE, where the first feedback information is used to indicate whether the second UE successfully receives the data; and sending second scheduling information to the first UE if the first feedback information indicates that the second UE fails to receive the data, where the second scheduling information is used to instruct the first UE to resend the data to the second UE.

Optionally, the CPU 822 is specifically configured to perform the following step:

sending downlink feedback information to the first UE, where the downlink feedback information is used to instruct the first UE to resend the data to the second UE based on the first scheduling information.

Optionally, the CPU 822 is specifically configured to perform the following step:

sending, to the first UE, the first scheduling information that includes indication information, where the indication information is used to indicate that the data is data that can be retransmitted; or sending, to the first UE, the first scheduling information that is processed by using a scrambling identifier, where the scrambling identifier is used to indicate that the data is data that can be retransmitted.

Figure 18:
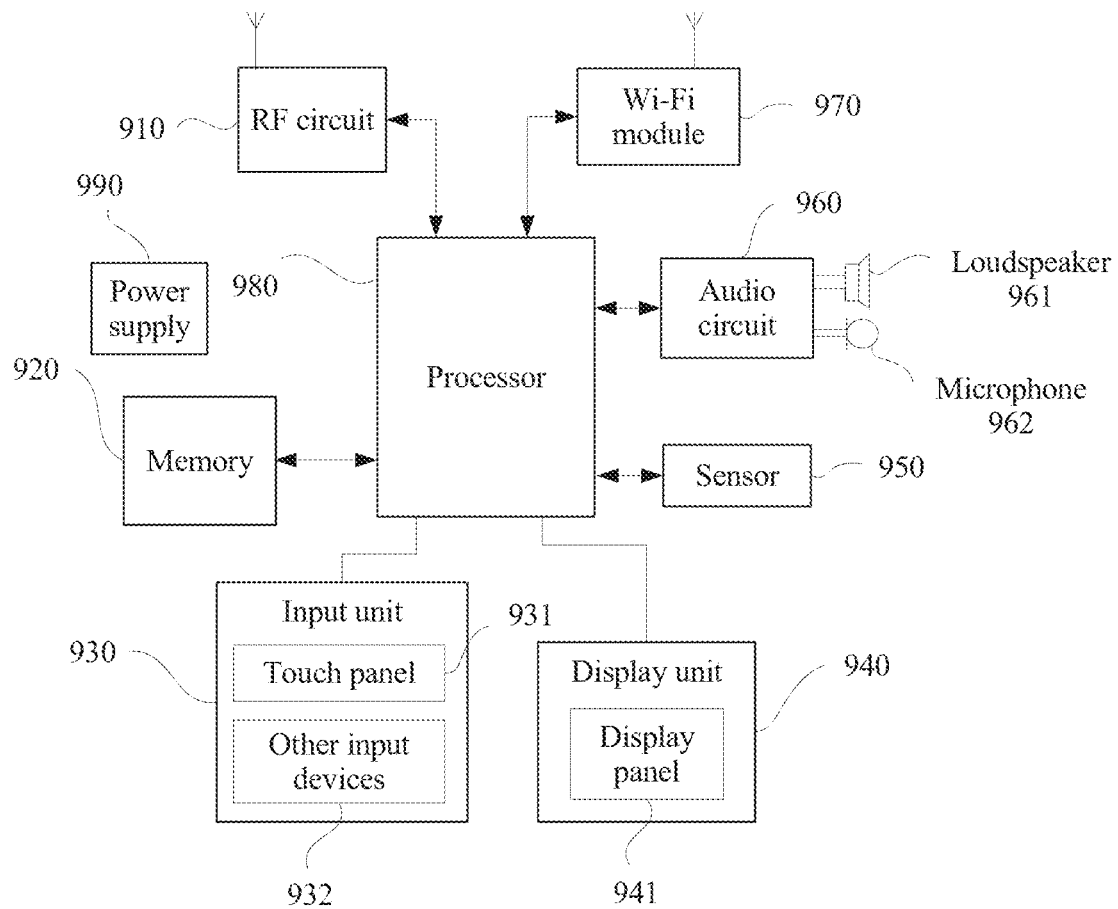
FIG. 18 is a schematic structural diagram of user equipment according to an embodiment of this application.

An embodiment of this application further provides another image display control apparatus. As shown in FIG. 18, for ease of description, only parts related to this embodiment of this application are shown. For specific technical details that are not disclosed, refer to the method part of the embodiments of this application. The terminal may be any terminal device including a mobile phone, a tablet computer, a personal digital assistant (PDA), a point of sale (POS), a vehicle-mounted computer, or the like. For example, the terminal is a mobile phone.

FIG. 18 is a block diagram of a partial structure of a mobile phone related to the terminal according to this embodiment of this application. Referring to FIG. 18, the mobile phone includes components such as a radio frequency (RF) circuit 910, a memory 920, an input unit 930, a display unit 940, a sensor 950, an audio circuit 960, a Wireless Fidelity (Wi-Fi) module 970, a processor 980, and a power supply 990. Persons skilled in the art may understand that, the structure of the mobile phone shown in FIG. 18 does not constitute a limitation on the mobile phone, and the mobile phone may include more or fewer components than those shown in the figure, or combine some components, or have different component arrangements.

All components of the mobile phone are described below in detail with reference to FIG. 18.

The RF circuit 910 may be configured to receive and send a signal in an information receiving or sending process or a call process. In particular, after receiving downlink information of a base station, the RF circuit 910 sends the downlink information to the processor 980 for processing, and in addition, sends related uplink data to the base station. Usually, the RF circuit 910 includes but is not limited to an antenna, at least one amplifier, a transceiver, a coupler, a low noise amplifier (LNA), a duplexer, and the like. In addition, the RF circuit 910 may further communicate with a network and another device through wireless communication. The wireless communication may use any communications standard or protocol, including but not limited to GSM, GPRS, CDMA, WCDMA, LTE, email, short message service (SMS), or the like.

The memory 920 may be configured to store a software program and a module. The processor 980 performs various function applications of the mobile phone and data processing by running the software program and the module that are stored in the memory 920. The memory 920 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone, and the like. In addition, the memory 920 may include a high-speed random access memory, and may further include a non-volatile memory, for example, at least one magnetic disk storage device, a flash memory device, or another volatile solid-state storage device.

The input unit 930 may be configured to: receive entered digit or character information, and generate key signal input related to user settings and function control of the mobile phone. Specifically, the input unit 930 may include a touch panel 931 and other input devices 932. The touch panel 931, also referred to as a touchscreen, may collect a touch operation (for example, an operation performed by a user on the touch panel 931 or near the touch panel 931 by using any proper object or accessory such as a finger or a stylus) of the user on or near the touch panel 931, and drive a corresponding connection apparatus based on a preset program. Optionally, the touch panel 931 may include two parts: a touch detection apparatus and a touch controller. The touch detection apparatus detects a touch direction of the user, detects a signal brought by the touch operation, and transmits the signal to the touch controller. The touch controller receives touch information from the touch detection apparatus, converts the touch information into touch point coordinates, then sends the touch point coordinates to the processor 980, and can receive and perform a command sent by the processor 980. In addition, the touch panel 931 may be implemented by using a plurality of types, such as a resistive type, a capacitive type, an infrared ray, and a surface acoustic wave. In addition to the touch panel 931, the input unit 930 may include the other input devices 932. Specifically, the other input devices 932 may include but are not limited to one or more of a physical keyboard, a function key (such as a volume control key or an on/off key), a trackball, a mouse, and a joystick.

The display unit 940 may be configured to display information entered by the user or information provided for the user, and various menus of the mobile phone. The display unit 940 may include a display panel 941. Optionally, the display panel 941 may be configured in a form such as a liquid crystal display (LCD) or an organic light-emitting diode (OLED). Further, the touch panel 931 may cover the display panel 941. When detecting the touch operation on or near the touch panel 931, the touch panel 931 transmits the touch operation to the processor 980 to determine a type of a touch event, and then the processor 980 provides corresponding visual output on the display panel 941 based on the type of the touch event. In FIG. 18, the touch panel 931 and the display panel 941 are used as two independent components to implement input and output functions of the mobile phone. However, in some embodiments, the touch panel 931 and the display panel 941 may be integrated to implement the input and output functions of the mobile phone.

The mobile phone may further include at least one sensor 950, such as a light sensor, a motion sensor, and other sensors. Specifically, the light sensor may include an ambient light sensor and a proximity sensor. The ambient light sensor may adjust luminance of the display panel 941 based on brightness of ambient light. The proximity sensor may turn off the display panel 941 and/or backlight when the mobile phone moves to an ear of the user. As a type of motion sensor, an accelerometer sensor may detect a value of an acceleration in each direction (generally, three axes), may detect a value and a direction of gravity in a static state, and may be used in an application for recognizing a mobile phone posture (such as screen switching between landscape and portrait modes, a related game, or magnetometer posture calibration), a function related to vibration recognition (such as a pedometer or a knock), and the like. For the other sensors such as a gyroscope, a barometer, a hygrometer, a thermometer, and an infrared sensor that may be further disposed on the mobile phone, details are not described herein.

The audio circuit 960, a loudspeaker 961, and a microphone 962 may provide an audio interface between the user and the mobile phone. The audio circuit 960 may transmit, to the speaker 961, an electrical signal converted from received audio data, and the speaker 961 converts the electrical signal into a sound signal for output. In addition, the microphone 962 converts a collected sound signal into an electrical signal, and the audio circuit 960 receives the electrical signal, converts the electrical signal into audio data, and outputs the audio data to the processor 980 for processing. Then, the audio data is sent to, for example, another mobile phone, by using the RF circuit 910, or the audio data is output to the memory 920 for further processing.

Wi-Fi belongs to a short-range wireless transmission technology. The mobile phone may help, by using the Wi-Fi module 970, the user receive and send an email, browse a web page, access streaming media, and the like. The Wi-Fi module 970 provides the user with wireless broadband Internet access. Although the Wi-Fi module 970 is shown in FIG. 18, it may be understood that the Wi-Fi module 970 is not a mandatory component of the mobile phone, and may be omitted as required without changing the essence of the present invention.

The processor 980 is a control center of the mobile phone, connects all parts of the entire mobile phone by using various interfaces and lines, and performs various functions of the mobile phone and data processing by running or executing the software program and/or the module that are/is stored in the memory 920 and by invoking data stored in the memory 920, to perform overall monitoring on the mobile phone. Optionally, the processor 980 may include one or more processing units. Optionally, an application processor and a modem processor may be integrated into the processor 980. The application processor mainly processes an operating system, a user interface, an application program, and the like. The modem processor mainly processes wireless communication. It may be understood that the modem processor may alternatively be not integrated into the processor 980.

The mobile phone further includes the power supply 990 (such as a battery) that supplies power to each component. Optionally, the power supply may be logically connected to the processor 980 by using a power supply management system, to implement functions such as charging management, discharging management, and power consumption management by using the power supply management system.

Although not shown, the mobile phone may further include a camera, a Bluetooth module, and the like. Details are not described herein.

In this embodiment of this application, the processor 980 included in the terminal further has the following functions:

receiving first scheduling information sent by a base station, where the first scheduling information is used to instruct first UE to send data to second UE based on the first scheduling information;

sending first feedback information to the base station, where the first feedback information is used to indicate whether the second UE successfully receives the data; and if the first feedback information indicates that the second UE fails to receive the data, receiving second scheduling information sent by the base station, where the second scheduling information is used to instruct the first UE to resend the data to the second UE.

Optionally, the processor 980 is further configured to perform the following steps:

receiving second feedback information sent by the second UE, where the second feedback information is used to indicate whether the second UE successfully receives the data; and determining the first feedback information based on the second feedback information.

Optionally, the processor 980 is specifically configured to perform the following step:

receiving downlink feedback information sent by the base station, where the downlink feedback information is used to instruct the first UE to resend the data to the second UE based on the first scheduling information.

Optionally, the processor 980 is further specifically configured to perform the following step:

determining the first scheduling information based on the downlink feedback information, where the first scheduling information is used to instruct the first UE to resend the data to the second UE.

Optionally, the processor 980 is specifically configured to perform the following step:

receiving the first scheduling information that includes indication information and that is sent by the base station, where the indication information is used to indicate that the data is data that can be retransmitted; or receiving the first scheduling information that is processed by using a scrambling identifier and that is sent by the base station, where the scrambling identifier is used to indicate that the data is data that can be retransmitted.

Figure 19:
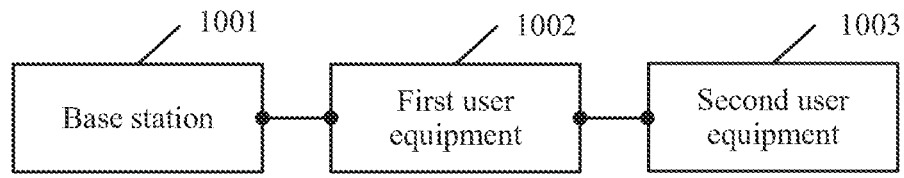
FIG. 19 is a schematic diagram of an embodiment of a data transmission system according to an embodiment of this application.

FIG. 19 is a schematic diagram of an embodiment of a data transmission system according to an embodiment of this application. The data transmission system includes:

a base station 1001, first UE 1002, and second UE 1003.

In this embodiment, the base station 1001 sends first scheduling information to the first UE 1002, and the first UE 1002 receives the first scheduling information sent by the base station 1001. The first scheduling information is used to instruct the first UE 1002 to send data to the second UE 1003 based on the first scheduling information. The first UE 1002 sends first feedback information to the base station 1001, and the base station 1001 receives the first feedback information sent by the first UE 1002. The first feedback information is used to indicate whether the second UE 1003 successfully receives the data. If the first feedback information indicates that the second UE 1003 fails to receive the data, the base station 1001 sends second scheduling information to the first UE 1002, and the first UE 1002 receives the second scheduling information sent by the base station 1001. The second scheduling information is used to instruct the first UE 1002 to resend the data to the second UE 1003.

In a technical solution of this embodiment of this application, the data transmission system is provided. First, the base station sends the first scheduling information to the first UE, where the first scheduling information is used to instruct the first UE to send the data to the second UE. Then the base station receives the first feedback information sent by the first UE, where the first feedback information is used to indicate whether the second UE successfully receives the data. The base station sends the second scheduling information to the first UE if the first feedback information indicates that the second UE fails to receive the data, where the second scheduling information is used to instruct the first UE to resend the data to the second UE. In the foregoing manner, the first UE may perceive a data receiving status of the second UE by receiving the first feedback information, so that a corresponding resource can be assigned again for data retransmission, thereby improving reliability of data transmission between the two UEs.

It may be clearly understood by persons skilled in the art that, for the purpose of convenient and brief description, for a detailed working process of the system, apparatus, and unit described above, refer to a corresponding process in the foregoing method embodiments. Details are not described herein again.

In the several embodiments provided in this application, it should be understood that the disclosed system, apparatus, and method may be implemented in other manners. For example, the apparatus embodiment described above is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be stored by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk solid state disk (SSD)), or the like.

The embodiments described above are merely intended for describing the technical solutions of this application, but not for limiting this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of this application.

What is claimed is:

1. A method, comprising:
   sending, by a network apparatus, first scheduling information indicating a plurality of sidelink (SL) time resources to a first terminal apparatus, the plurality of SL time resources are for the first terminal apparatus to send data to a second terminal apparatus;
   receiving, by the network apparatus, first feedback information after a last SL time resource of the plurality of SL time resources from the first terminal apparatus, wherein the first feedback information indicates whether the second terminal apparatus successfully receives the data, the first feedback information is determined based on second feedback information, and the second feedback information is from the second terminal apparatus to the first terminal apparatus; and
   sending, by the network apparatus, based on the first feedback information indicating that the second terminal apparatus fails to receive the data, second scheduling information indicating a second plurality of SL time resources to the first terminal apparatus, the second plurality of SL time resources including a second SL time resource, wherein the second scheduling information instructs the first terminal apparatus to retransmit the data to the second terminal apparatus using the second SL time resource.

2. The method according to claim 1, wherein the first scheduling information includes indication information indicating that the data can be retransmitted.

3. The method according to claim 2,
   wherein the second feedback information is an acknowledgement (ACK), and the first feedback information is the ACK, or
   wherein the second feedback information is a negative acknowledgement (NACK), and the first feedback information is the NACK, or
   wherein the first terminal apparatus fails to receive the second feedback information, and the first feedback information is a NACK.

4. The method according to claim 1, further comprising:
   sending, by the network apparatus, downlink feedback information to the first terminal apparatus, wherein the downlink feedback information instructs the first terminal apparatus to retransmit the data to the second terminal apparatus based on the first scheduling information.

5. A method, comprising:
   receiving, by a first terminal apparatus, first scheduling information indicating a plurality of sidelink (SL) time resources from a network apparatus, the plurality of SL time resources are for the first terminal apparatus to send data to a second terminal apparatus;
   sending, by the first terminal apparatus, first feedback information after a last SL time resource of the plurality of SL time resources to the network apparatus, wherein the first feedback information indicates whether the second terminal apparatus successfully receives the data, the first feedback information is determined based on second feedback information, and the second feedback information is from the second terminal apparatus to the first terminal apparatus; and receiving, by the first terminal apparatus, based on the first feedback information indicating that the second terminal apparatus fails to receive the data, second scheduling information indicating a second plurality of SL time resources from the network apparatus, the second plurality of SL time resources including a second SL time resource, wherein the second scheduling information instructs the first terminal apparatus to retransmit the data to the second terminal apparatus using the second SL time resource.

6. The method according to claim 5, wherein the first scheduling information includes indication information indicating that the data can be retransmitted.

7. The method according to claim 6,
wherein the second feedback information is an acknowledgement (ACK), the first feedback information is the ACK, or
wherein the second feedback information is a negative acknowledgement (NACK), the first feedback information is the NACK, or
wherein the first terminal apparatus fails to receive the second feedback information, the first feedback information is a NACK.

8. The method according to claim 5, further comprising:
receiving, by the first terminal apparatus, downlink feedback information from the network apparatus, wherein the downlink feedback information instructs the first terminal apparatus to retransmit the data to the second terminal apparatus based on the first scheduling information.

9. A network apparatus, comprising:
one or more processors; and
a non-transitory memory, wherein the non-transitory memory stores instructions, and when executing the instructions stored in the non-transitory memory, the network apparatus executes operations comprising:
sending, first scheduling information indicating a plurality of sidelink (SL) time resources to a first terminal apparatus, the plurality of SL time resources are for the first terminal apparatus to send data to a second terminal apparatus;
receiving, first feedback information after a last SL time resource of the plurality of SL time resources from the first terminal apparatus, wherein the first feedback information indicates whether the second terminal apparatus successfully receives the data, the first feedback information is determined based on second feedback information, and the second feedback information is from the second terminal apparatus to the first terminal apparatus; and
sending, based on the first feedback information indicating that the second terminal apparatus fails to receive the data, second scheduling information indicating a second plurality of SL time resources to the first terminal apparatus, the second plurality of SL time resources including a second SL time resource, wherein the second scheduling information instructs the first terminal apparatus to retransmit the data to the second terminal apparatus using the second SL time resource.

10. The network apparatus according to claim 9, wherein the first scheduling information includes indication information indicating that the data can be retransmitted.

11. The network apparatus according to claim 10,
wherein the second feedback information is an acknowledgement (ACK), and the first feedback information is the ACK, or
wherein the second feedback information is a negative acknowledgement (NACK), and the first feedback information is the NACK, or
wherein the first terminal apparatus fails to receive the second feedback information, and the first feedback information is a NACK.

12. The network apparatus according to claim 9, the operations further comprising:
sending downlink feedback information to the first terminal apparatus, wherein the downlink feedback information instructs the first terminal apparatus to retransmit the data to the second terminal apparatus based on the first scheduling information.

13. A first terminal apparatus, comprising:
one or more processors; and
a non-transitory memory, wherein the non-transitory memory stores instructions, and when executing the instructions stored in the non-transitory memory, the first terminal apparatus executes operations comprising:
receiving, first scheduling information indicating a plurality of sidelink (SL) time resources from a network apparatus, the plurality of SL time resources are for the first terminal apparatus to send data to a second terminal apparatus;
sending, first feedback information after a last SL time resource of the plurality of SL time resources to the network apparatus, wherein the first feedback information indicates whether the second terminal apparatus successfully receives the data, the first feedback information is determined based on second feedback information, and the second feedback information is from the second terminal apparatus to the first terminal apparatus; and
receiving, based on the first feedback information indicating that the second terminal apparatus fails to receive the data, second scheduling information indicating a second plurality of SL time resources from the network apparatus, the second plurality of SL time resources including a second SL time resource, wherein the second scheduling information instructs the first terminal apparatus to retransmit the data to the second terminal apparatus using the second SL time resource.

14. The first terminal apparatus according to claim 13, wherein the first scheduling information includes indication information indicating that the data can be retransmitted.

15. The first terminal apparatus according to claim 14,
wherein the second feedback information is an acknowledgement (ACK), and the first feedback information is the ACK, or
wherein the second feedback information is a negative acknowledgement (NACK), and the first feedback information is the NACK, or
wherein the first terminal apparatus fails to receive the second feedback information, and the first feedback information is a NACK.

16. The first terminal apparatus according to claim 13, the operations further comprising:
receiving downlink feedback information from the network apparatus, wherein the downlink feedback information instructs the first terminal apparatus to retransmit the data to the second terminal apparatus based on the first scheduling information.

17. A non-transitory computer readable medium storing instructions that, when executed by a first terminal apparatus, causes the first terminal apparatus to execute operations comprising:

receiving, first scheduling information indicating a plurality of sidelink (SL) time resources from a network apparatus, the plurality of SL time resources are for the first terminal apparatus to send data to a second terminal apparatus;

sending, first feedback information after a last SL time resource of the plurality of SL time resources to the network apparatus, wherein the first feedback information indicates whether the second terminal apparatus successfully receives the data, the first feedback information is determined based on second feedback information, and the second feedback information is from the second terminal apparatus to the first terminal apparatus; and receiving, based on the first feedback information indicating that the second terminal apparatus fails to receive the data, second scheduling information indicating a second plurality of SL time resources from the network apparatus, the second plurality of SL time resources including a second SL time resource, wherein the second scheduling information instructs the first terminal apparatus to retransmit the data to the second terminal apparatus using the second SL time resource.

* * * * *

UNITED STATES PATENT AND TRADEMARK OFFICE
CERTIFICATE OF CORRECTION

| | | |
|---|---|---|
| PATENT NO. | : 12,096,427 B2 | Page 1 of 1 |
| APPLICATION NO. | : 17/375052 | |
| DATED | : September 17, 2024 | |
| INVENTOR(S) | : Lu et al. | |

It is certified that error appears in the above-identified patent and that said Letters Patent is hereby corrected as shown below:

In the Specification

In Column 26, Line 59, delete "FIG. g," and insert -- FIG. 9, --.

Signed and Sealed this
Twenty-second Day of October, 2024

Katherine Kelly Vidal
*Director of the United States Patent and Trademark Office*